United States Patent
Naganuma

(10) Patent No.: US 6,650,797 B2
(45) Date of Patent: Nov. 18, 2003

(54) WAVELENGTH CHARACTERISTICS CONTROL DEVICE, GAIN EQUALIZER AND LIGHT AMPLIFIER

(75) Inventor: Norihisa Naganuma, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/068,941

(22) Filed: Feb. 11, 2002

(65) Prior Publication Data

US 2002/0090161 A1 Jul. 11, 2002

Related U.S. Application Data

(62) Division of application No. 09/187,748, filed on Nov. 9, 1998, now Pat. No. 6,370,285.

(30) Foreign Application Priority Data

Mar. 20, 1998 (JP) .............................. 10-071756

(51) Int. Cl.$^7$ ................................. G02B 6/00
(52) U.S. Cl. .............................. 385/11; 385/9; 359/122; 359/124; 359/337.1; 359/579; 359/484; 359/497
(58) Field of Search ................................ 385/11, 9, 96; 359/484, 487, 488, 196, 124, 122, 249–251, 256, 278, 497, 282, 283, 578, 579; 399/337.1

(56) References Cited

U.S. PATENT DOCUMENTS 5,311,217 A    5/1994  Guerin et al. ............... 347/246
5,408,555 A    4/1995  Fielding et al. ............... 385/43
5,446,578 A *  8/1995  Chang et al. ............... 359/282
5,636,053 A    6/1997  Pan ............................ 359/341
5,867,291 A    2/1999  Wu et al. .................... 359/124
5,936,768 A    8/1999  Oguma ........................ 359/484
6,252,711 B1 * 6/2001  Damask et al. ............. 359/498
6,407,836 B1 * 6/2002  Fukushima .................. 359/124
6,426,816 B1 * 7/2002  Wu et al. .................... 359/122
6,493,129 B2 * 12/2002 Terahara et al. ............ 359/283

FOREIGN PATENT DOCUMENTS

WO    WO 02/079865 A1 *   3/2001   ................. 359/282

OTHER PUBLICATIONS

Patent Abstracts of Japan, No. 08204647; Aug. 9, 1996.
Patent Abstracts of Japan, No. 09093200; Apr. 4, 1997.
Patent Abstracts of Japan, No. 09189824; Jul. 22, 1997.
Melles Griot Optics Guide 5, Chapter 14, p. 28–30.

* cited by examiner

*Primary Examiner*—John Juba
*Assistant Examiner*—Fayez Assaf
(74) *Attorney, Agent, or Firm*—Staas & Halsey LLP

(57) ABSTRACT

A wavelength characteristic control device capable of variably controlling a wavelength characteristic in a satisfactory manner. A polarized light wavelength characteristic changing element has a wavelength characteristic such that the transmittances or reflectances of P- and S-polarized rays vary differently with respect to wavelength. Polarization variable control means subjects the plane of polarization of the polarized light incident on the polarized light wavelength characteristic changing element to rotatory control to change the ratio of the P-polarized ray to the S-polarized ray, thereby variably controlling the wavelength characteristic.

50 Claims, 18 Drawing Sheets

WAVELENGTH CHARACTERISTICS CONTROL DEVICE, GAIN EQUALIZER AND LIGHT AMPLIFIER

This application is a divisional of application Ser. No. 09/187,748 filed Nov. 9, 1998, now U.S. Pat. No. 6,370,285.

BACKGROUND OF THE INVENTION (1) Field of the Invention

The present invention relates to a wavelength characteristic control device, a gain equalizer and a light amplifier, and more particularly, to a wavelength characteristic control device for controlling a wavelength characteristic of polarized light, a gain equalizer for actively equalizing a gain-wavelength characteristic, and to a light amplifier for amplifying signal light and actively equalizing a gain-wavelength characteristic.

(2) Description of the Related Art

The spread of optical communication networks of late years has created a demand for larger-capacity communications over a longer distance, and as a means of meeting the demand, light amplifiers and wavelength division multiplexing (WDM) are attracting attention as next-generation optical communication techniques.

FIG. 17 schematically illustrates the arrangement of a conventional light amplifier. A light amplifier 200 comprises an EDF (Erbium-Doped Fiber) 201 and a PumpLD (pumped laser diode) 202.

The EDF 201 is an optical fiber doped with Er (erbium), which is a rare-earth element, and electrons are excited to a high level by excitation light from the PumpLD 202. As signal light enters the Er atoms within the optical fiber, stimulated emission takes place and the power of the signal light is progressively amplified along the optical fiber.

The gain amplified in this case has a wavelength characteristic. Namely, the gain varies depending on the wavelength of the signal light. Thus, if light amplifiers are used directly in WDM optical transmission systems, an awkward situation arises.

For example, if light amplifiers 200 are arranged in multiple stages along a WDM transmission path, there occurs a gain difference depending on wavelength and a signal with unreceivable S/N is generated, making it impossible to perform full wavelength transmission properly.

Thus, in a conventional WDM optical transmission system having light amplifiers 200 connected thereto, a gain equalizer for flattening gain is built into each of the light amplifiers 200 or is arranged on the transmission path for every several stages of light amplifiers 200.

FIGS. 18(A), 18(B) and 18(C) illustrate gain-wavelength characteristics. FIG. 18(A) shows a cumulative gain-wavelength characteristic of a plurality of light amplifiers 200, wherein the horizontal and vertical axes indicate wavelength $\lambda$ and gain G, respectively. Let it be assumed that there is a gain difference of $\Delta G$ between wavelengths $\lambda 1$ and $\lambda 2$, as shown in FIG. 18(A).

FIG. 18(B) shows a loss-wavelength characteristic of a gain equalizer, wherein the horizontal and vertical axes indicate wavelength $\lambda$ and lost gain G, respectively. A gain equalizer having the characteristic shown in FIG. 18(B) is inserted in the transmission path.

FIG. 18(C) shows a flattened gain-wavelength characteristic, wherein the horizontal and vertical axes indicate wavelength $\lambda$ and gain G, respectively. As shown in FIG. 18(C), the passband between the wavelengths $\lambda 1$ and $\lambda 2$ of the transmission path having the gain equalizer inserted therein shows a flattened gain-wavelength characteristic.

In this manner, when relaying signal light with the use of light amplifiers 200 which are usually arranged in multiple stages, gain equalizers having a loss-wavelength characteristic reverse to the gain-wavelength characteristic of the light amplifiers are inserted, to thereby flatten the gain-wavelength characteristic.

However, the operating point of the light amplifier 200 as described above varies with change in external factors such as environmental temperature. Also, the propagation characteristic of the transmission path varies depending on external conditions.

Consequently, the level of signal light input to the light amplifier 200 undergoes fluctuation, making it necessary to change excitation conditions so as to keep the output level constant.

Specifically, it is necessary that the PumpLD 202 emit intenser light when the input level is low and emit less intense light when the input level is high.

If, however, the power of excitation light incident on the EDF 201 varies, then the gain-wavelength characteristic of the light amplifier 200 also changes. On the other hand, the loss-wavelength characteristic of the gain equalizer is set beforehand and cannot be actively changed in response to change in the gain-wavelength characteristic.

Accordingly, if the operating point of the light amplifier 200 or the propagation characteristic of the transmission path varies, the conventional gain equalizer is unable to follow the varying gain-wavelength characteristic, thus failing to perform high-accuracy gain equalization.

As a result, the gain-wavelength characteristic cannot be flattened, giving rise to a problem that the transmission quality lowers and that only short-distance transmission is achievable.

To prevent variation of the operating point etc., the operating conditions of the light amplifier 200 must be strictly determined taking the transmission path also into consideration, but this imposes extremely heavy restrictions on design, causing lack of flexibility.

SUMMARY OF THE INVENTION

A first object of the present invention is to provide a wavelength characteristic control device capable of variably controlling a wavelength characteristic in a satisfactory manner.

A second object of the present invention is to provide a gain equalizer which is capable of high-accuracy gain equalization and thus can improve transmission quality.

A third object of the present invention is to provide a light amplifier which performs high-accuracy gain equalization after amplification of signal light, thereby improving transmission quality.

To achieve the first object, there is provided a wavelength characteristic control device for controlling a wavelength characteristic of polarized light. The wavelength characteristic control device comprises a polarized light wavelength characteristic changing element having the wavelength characteristic such that transmittances or reflectances of P- and S-polarized rays vary differently with respect to wavelength, and polarization variable control means for subjecting a plane of polarization of the polarized light incident on the polarized light wavelength characteristic changing element to rotatory control to change a ratio of the P-polarized ray to the S-polarized ray, thereby variably controlling the wavelength characteristic.

To achieve the second object, there is provided a gain equalizer for actively equalizing a gain-wavelength characteristic. The gain equalizer comprises polarized light separating means for separating polarized signal light, polarization plane coincidence control means for making planes of polarization of a plurality of separated polarized rays coincident with each other, to thereby generate first polarized light, polarization variable control means for subjecting the plane of polarization of the first polarized light to rotatory control to change a ratio of a P-polarized ray to an S-polarized ray, a polarized light wavelength characteristic changing element for generating second polarized light having a wavelength characteristic corresponding to the changed ratio, polarization restoring means for subjecting the plane of polarization of the second polarized light to inverse rotatory control reverse to the rotatory control performed by the polarization variable control means on the plane of polarization of the first polarized light, to restore a polarized state identical with that of the first polarized light and thereby generate third polarized light, and polarized light synthesizing means for synthesizing the third polarized light.

To achieve the third object, there is provided a light amplifier for amplifying signal light and actively equalizing a gain-wavelength characteristic. The light amplifier comprises amplifying means for amplifying the signal light, polarized light separating means for separating the amplified signal light, polarization plane coincidence control means for making planes of polarization of a plurality of separated polarized rays coincident with each other, to thereby generate first polarized light, polarization variable control means for subjecting the plane of polarization of the first polarized light to rotatory control to change a ratio of a P-polarized ray to an S-polarized ray, a polarized light wavelength characteristic changing element for generating second polarized light having a wavelength characteristic corresponding to the changed ratio, polarization restoring means for subjecting the plane of polarization of the second polarized light to inverse rotatory control reverse to the rotatory control performed by the polarization variable control means on the plane of polarization of the first polarized light, to restore a polarized state identical with that of the first polarized light and thereby generate third polarized light, and polarized light synthesizing means for synthesizing the third polarized light.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
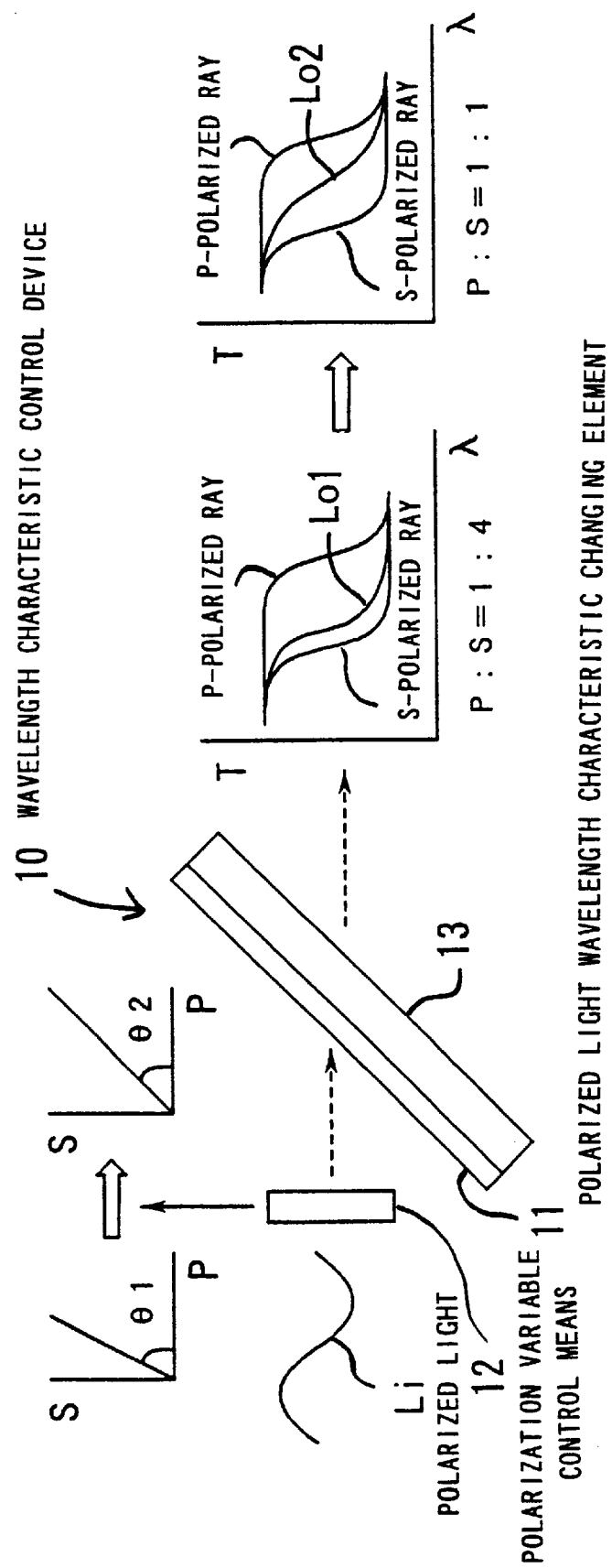
FIG. 1 is a diagram illustrating the principles of a wavelength characteristic control device according to the present invention.

Embodiments of the present invention will be hereinafter described with reference to the drawings. FIG. 1 illustrates the principles of a wavelength characteristic control device according to the present invention. A wavelength characteristic control device 10 controls a wavelength characteristic of polarized light Li (signal light) emitted from a semiconductor laser and propagated through an optical fiber.

The wavelength characteristic denotes herein the transmittance with respect to wavelength. The following description applies equally if the wavelength characteristic to be controlled is reflectance, but in the following, transmittance is referred to as such wavelength characteristic.

A polarized light wavelength characteristic changing element 11 is an optical element having a wavelength characteristic such that the transmittances (or reflectances) of a P-polarized ray, which is a horizontally polarized ray, and an S-polarized ray, which is a vertically polarized ray, vary differently. In FIG. 1, the polarized light wavelength characteristic changing element 11 is deposited on a glass substrate 13. The polarized light wavelength characteristic changing element 11 may, for example, be a dielectric multilayer film in which thin dielectric layers with high and low refractive indexes are alternately laid one upon the other in multiple layers, or a fiber fusion spliced device in which two optical fibers are fusion spliced and drawn out for optical coupling/splitting, to thereby impart a certain wavelength characteristic to the device.

Polarization variable control means 12 subjects the plane of polarization of the polarized light Li incident on the polarized light wavelength characteristic changing element 11 to rotatory control to change the ratio (transmission ratio) of the P-polarized ray to the S-polarized ray, thereby variably controlling the wavelength characteristic.

In FIG. 1, for the polarized light Li of which the plane of polarization is at an angle of θ1, polarized light Lo1 having a wavelength characteristic such that the ratio of the P-polarized ray to the S-polarized ray is P:S=1:4 is output.

By subjecting the plane of polarization to rotatory control with the use of the polarization variable control means 12, the angle is changed from θ1 to θ2.

In this case, polarized light Lo2 having a wavelength characteristic such that the ratio of the P-polarized ray to the S-polarized ray is P:S=1:1 is output. In the figure, T represents transmittance and λ represents wavelength.

Thus, by changing the ratio of the P-polarized ray to the S-polarized ray, it is possible to variably control the wavelength characteristic.

The polarization variable control means 12 may be a wave plate, a liquid crystal, or a Faraday rotator described later. In the case of using a wave plate, the wavelength characteristic can be variably controlled by rotating the wave plate. The wavelength characteristic may alternatively be controlled by applying a stress to a fiber loop.

Figure 2:
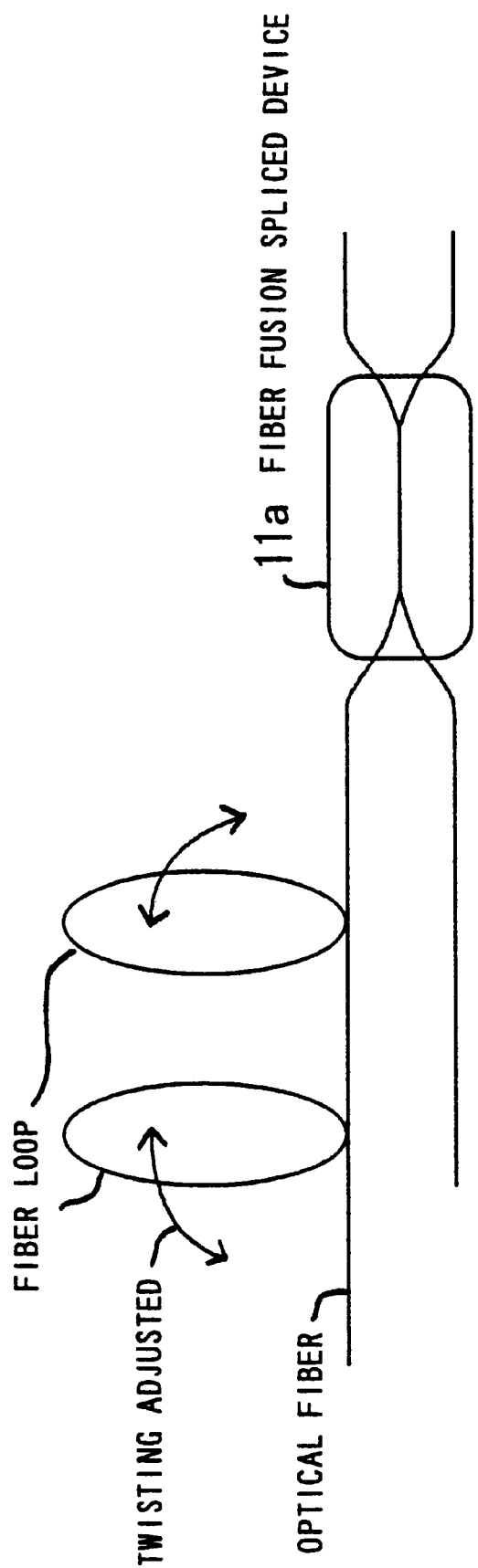
FIG. 2 is a diagram showing a wavelength characteristic control device using a fiber fusion spliced device.

FIG. 2 shows a wavelength characteristic control device 10 using a fiber fusion spliced device. As the polarized light wavelength characteristic changing element 11, a fiber fusion spliced device 11a is used. The polarization variable control means 12 is implemented by applying a stress to a fiber loop and thereby controlling the wavelength characteristic.

Specifically, one or more fiber loops have twisting thereof adjusted, as shown in FIG. 2, to thereby subject the plane of polarization to rotatory control. Polarized light polarized in a desired state is then made to enter the fiber fusion spliced device 11a. In this manner, the wavelength characteristic can be variably controlled.

Figure 3:
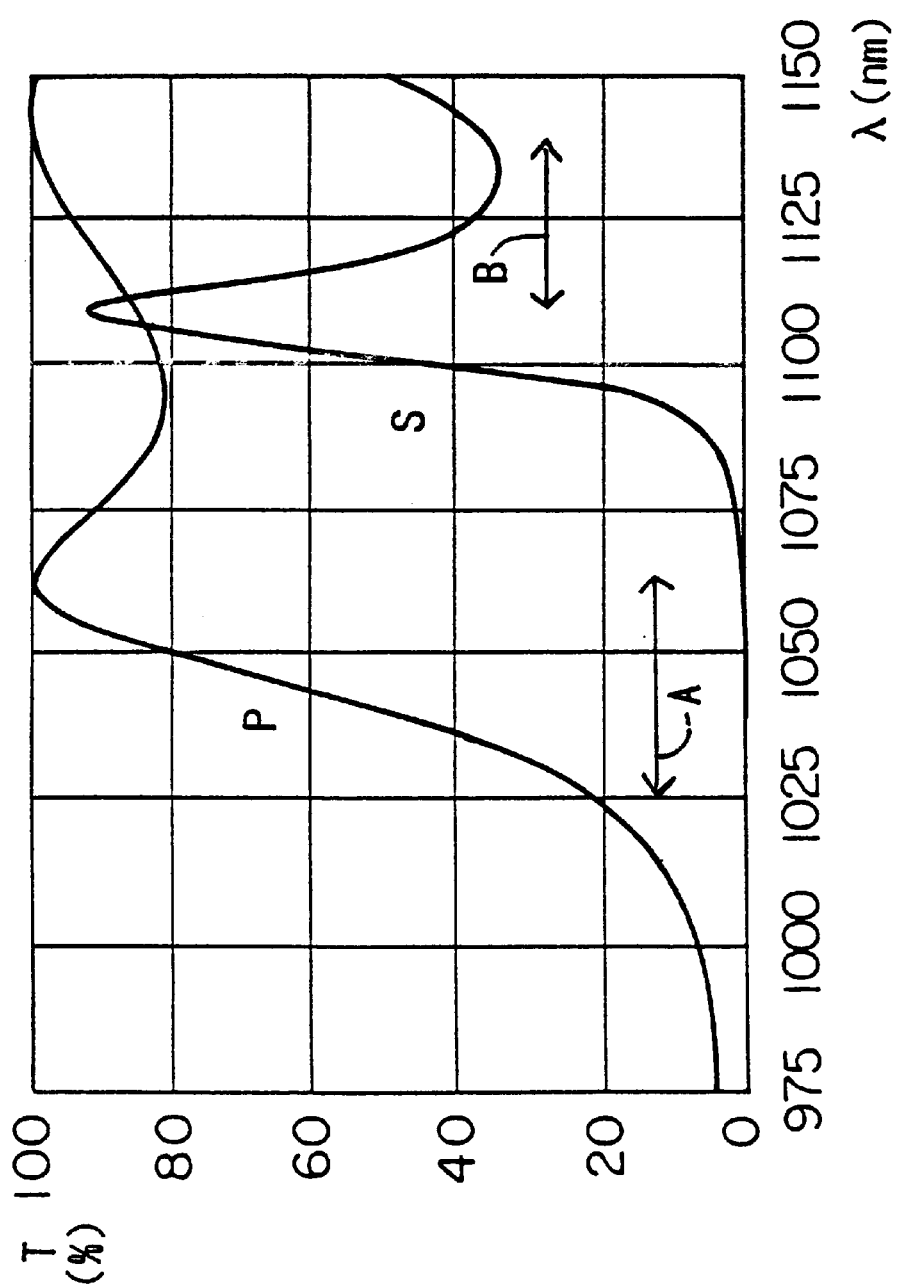
FIG. 3 is a graph showing wavelength characteristics of a polarized light wavelength characteristic changing element.

The wavelength characteristic of the polarized light wavelength characteristic changing element 11 will be now explained. FIG. 3 shows a wavelength characteristic of the polarized light wavelength characteristic changing element 11, wherein the vertical and horizontal axes indicate transmittance T (%) and wavelength λ (nm), respectively.

As shown in FIG. 3, the polarized light wavelength characteristic changing element 11 shows an increase and decrease of transmittance in a certain correlation with respect to wavelength.

As a wavelength region with respect to which gain equalization is to be performed by the wavelength characteristic control device 10, a region where a difference of wavelength characteristic between the P- and S-polarized rays greatly varies is set, that is, a wavelength region (wavelength region A) where the transmittance of the P-polarized ray sharply increases from 20% to 100% while the transmittance of the S-polarized ray is close to 0% or a wavelength region (wavelength region B) where the transmittance of the S-polarized ray sharply drops from about 90% to 40% while the transmittance of the P-polarized ray is nearly 100% is set.

In the case of a multi-wavelength signal band, if 16 waves are present in an interval of 0.8 nm, for example, then the band is about 12 nm. Since the wavelength characteristic needs to be changed within such a very narrow band, it is necessary to select a wavelength region where the rate of change of transmittance with respect to wavelength is large.

Figure 4:
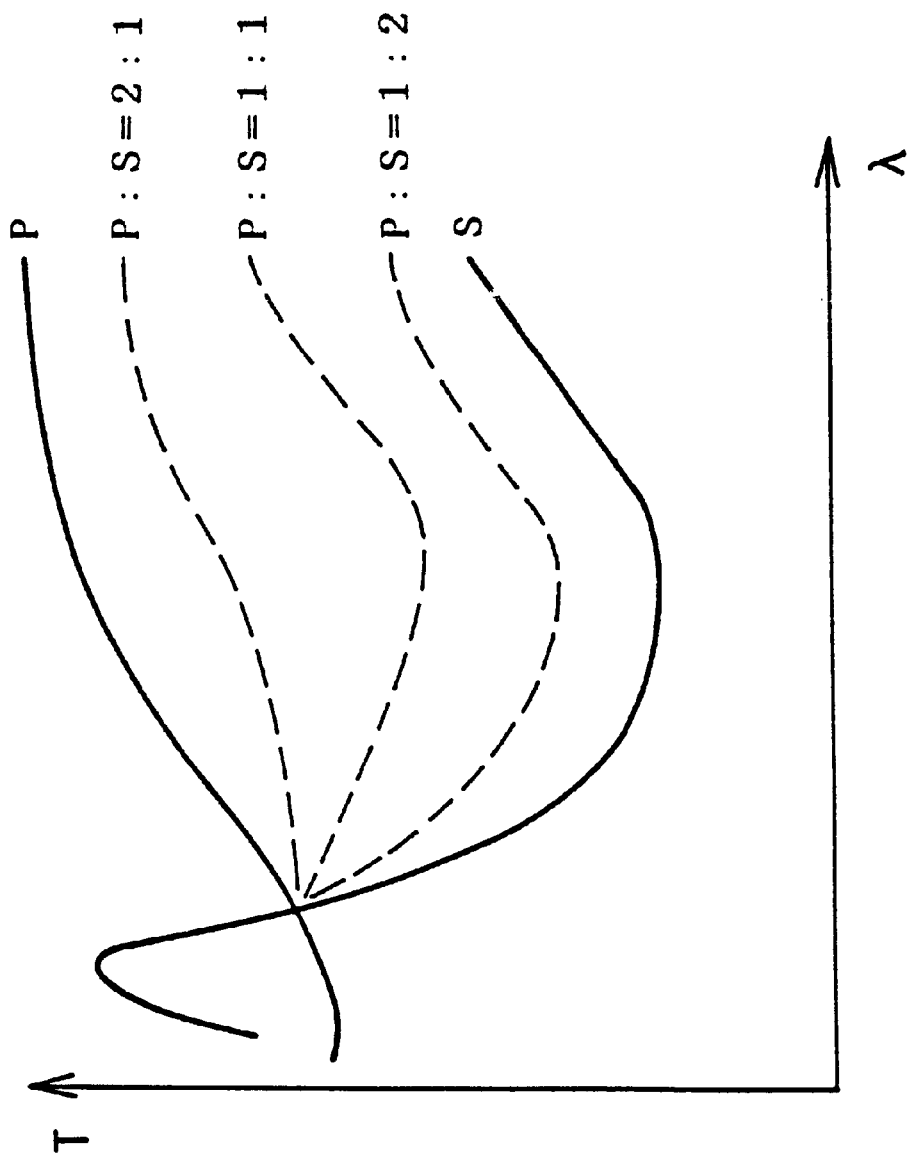
FIG. 4 is a graph showing a wavelength region in an enlarged manner.

FIG. 4 shows the wavelength region B in an enlarged manner. With respect to signal light having a wavelength falling within the wavelength region B, the ratio of the P-polarized ray to the S-polarized ray is changed to thereby variably control the wavelength characteristic.

As stated above, the wavelength characteristic control device 10 of the present invention has a construction such that the plane of polarization of polarized light incident on the polarized light wavelength characteristic changing element 11 is subjected to rotatory control to change the ratio of the P-polarized ray to the S-polarized ray, thereby variably controlling the wavelength characteristic.

Accordingly, even if there occurs a change in external factors such as environmental temperature, the wavelength characteristic can be satisfactorily subjected to variable control.

The wavelength characteristic control device 10 of the present invention may be applied to a gain equalizer mentioned above, in which case, even if the gain-wavelength characteristic of the output of the light amplifier 200 varies, it can be actively equalized, permitting high-accuracy gain equalization.

Figure 5:
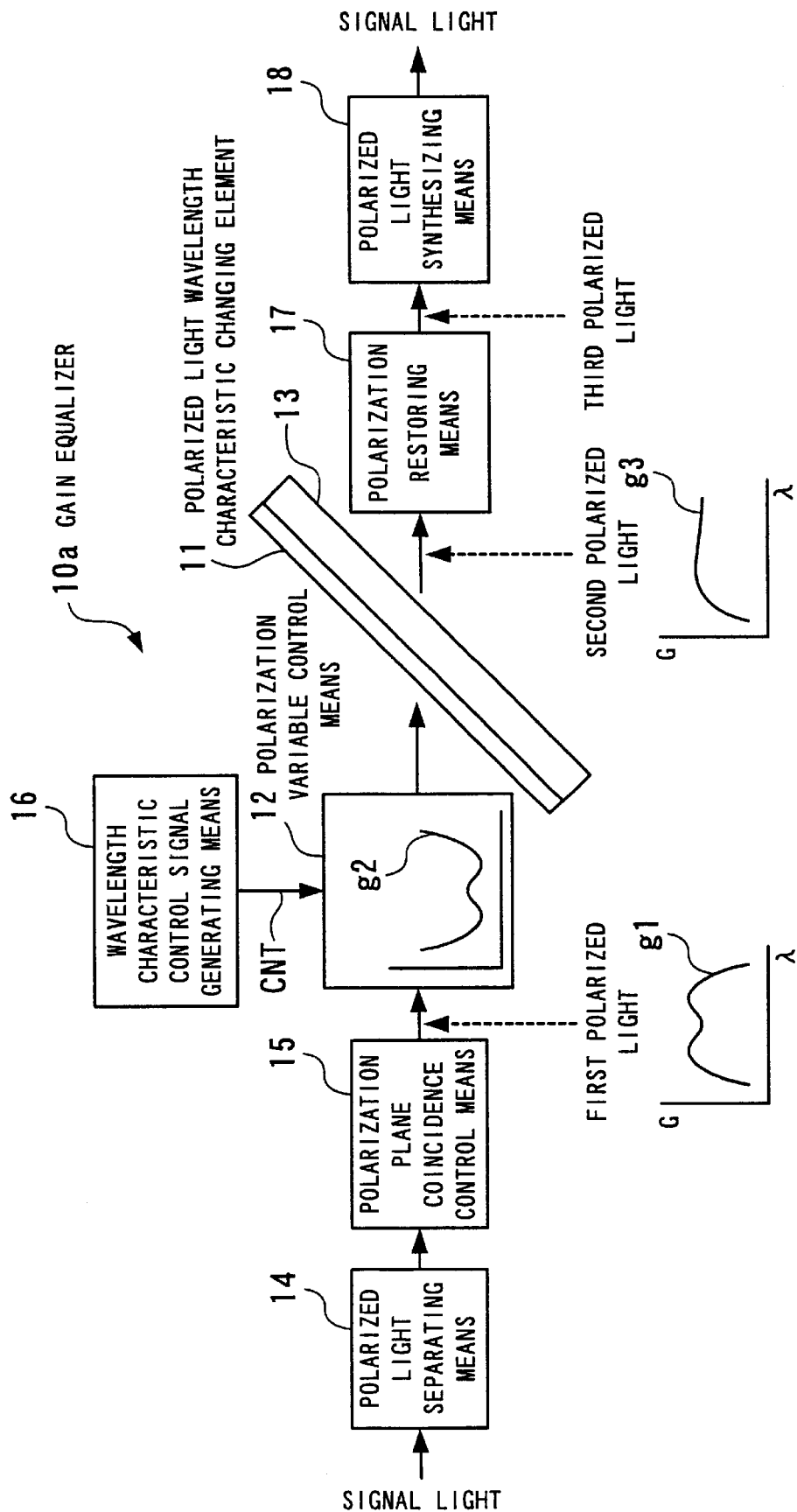
FIG. 5 is a diagram illustrating the principles of a gain equalizer according to the present invention.

A gain equalizer according to the present invention, to which the wavelength characteristic control device 10 is applied, will be now described. FIG. 5 illustrates the principles of the gain equalizer according to the present invention. When the gain-wavelength characteristic of input signal light varies, a gain equalizer 10a actively equalizes the gain-wavelength characteristic. The gain-wavelength characteristic denotes herein the gain with respect to wavelength.

Polarized light separating means 14 separates polarized signal light in which wavelengths are multiplexed and of which the gain-wavelength characteristic varies. Specifically, signal light which is output from a light amplifier and of which the gain-wavelength characteristic varies is input to the polarized light separating means 14, which separates the polarized signal light. The polarized light separating means 14 may be a birefringent crystal or a dielectric multilayer film.

Polarization plane coincidence control means 15 makes the planes of polarization of a plurality of light rays, which are obtained as a result of polarized light separation, coincident with each other, thereby generating first polarized light. In the example shown in FIG. 5, the first polarized light has a gain-wavelength characteristic g1.

Wavelength characteristic control signal generating means 16 generates a wavelength characteristic control signal CNT for controlling the wavelength characteristic.

In accordance with the wavelength characteristic control signal CNT, polarization variable control means 12 subjects the plane of polarization of the first polarized light to rotatory control to change the ratio of the P-polarized ray to the S-polarized ray so that a loss-wavelength characteristic g2 reverse to the gain-wavelength characteristic g1 may be obtained.

A polarized light wavelength characteristic changing element 11 deposited on a glass substrate 13 passes therethrough the first polarized light according to a wavelength characteristic corresponding to the thus-set ratio of the P-polarized ray to the S-polarized ray, thereby generating second polarized light of which the gain-wavelength characteristic is flattened (gain-wavelength characteristic g3).

Polarization restoring means 17 subjects the plane of polarization of the second polarized light to inverse rotatory control to restore a polarized state identical with that of the first polarized light, thereby generating third polarized light. Namely, the plane of polarization of the second polarized light is returned to that of the first polarized light which is input to the polarization variable control means 12.

Polarized light synthesizing means 18 synthesizes the third polarized light, which comprises a plurality of separate light rays, into one light beam, which is then output as signal light. Synthesis of the polarized light is carried out after the plane of polarization of one polarized light ray is rotated by 90 degrees. The polarized light synthesizing means 18 is constituted by a birefringent crystal or a dielectric multilayer film.

Figure 6:
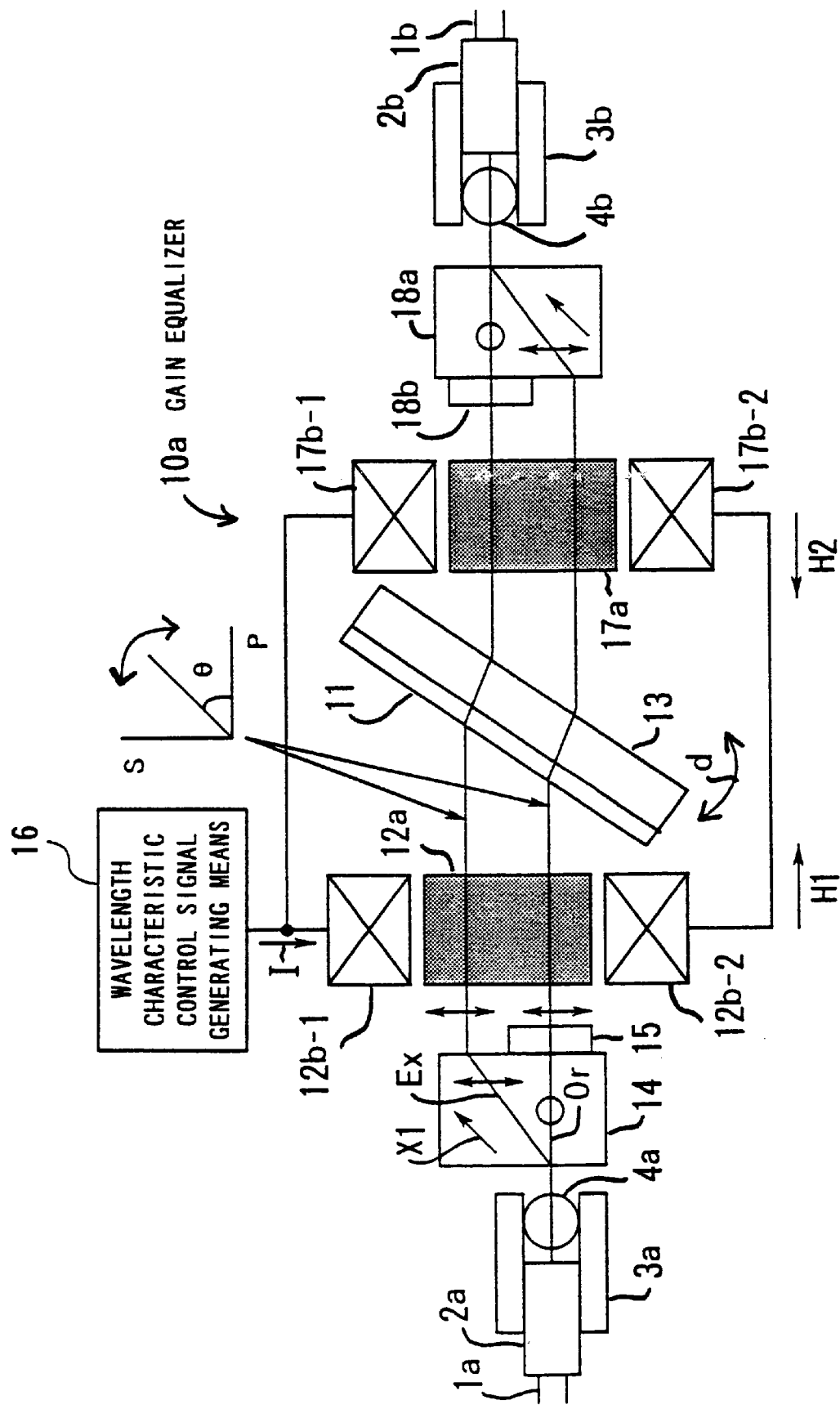
FIG. 6 is a diagram showing in detail the arrangement of the gain equalizer.

Detailed arrangement and operation of the gain equalizer 10a will be now described. FIG. 6 shows details of the arrangement of the gain equalizer 10a.

An input fiber 1a, through which multi-wavelength light amplified at an EDF in a light amplifier is propagated, is firmly affixed to a ferrule 2a.

A lens holder 3a, to which a collimating lens 4a is fixed, is secured to the ferrule 2a by welding after the focal point with respect to the input fiber 1a is adjusted. The collimating lens 4a emits a parallel beam.

The polarized signal light propagated through the optical fiber is linearly polarized light, elliptically polarized light or circularly polarized light and thus is in a randomly polarized state (referred to as randomly polarized light). It is therefore necessary to make the planes of polarization coincident with each other before the polarized light enters the polarized light wavelength characteristic changing element 11.

First, the signal light, which is randomly polarized light, is separated into an ordinary ray and an extraordinary ray by a parallel rutile plate 14 corresponding to the polarized light separating means 14.

Specifically, a ray of the randomly polarized light whose direction of vibrations is perpendicular to a plane of the parallel rutile plate 14 containing a crystal axis X1 is emitted as an ordinary ray Or, and a ray of the randomly polarized light whose direction of vibrations is parallel to the plane containing the crystal axis X1 is emitted as an extraordinary ray Ex.

A ½ wave plate 15, which corresponds to the polarization plane coincidence control means 15, is arranged on the ordinary ray side (it may alternatively be arranged on the extraordinary ray side) and rotates the plane of polarization of the ordinary ray by 90 degrees so that the ordinary ray and the extraordinary ray may have an identical plane of polarization.

The ordinary and extraordinary rays (first polarized light) having an identical plane of polarization have their planes of polarization rotated by a Faraday rotator 12a corresponding to the polarization variable control means 12 so that a desired loss-wavelength characteristic may be obtained. The ordinary ray and the extraordinary ray denote herein an ordinary ray and an extraordinary ray within the crystal, respectively.

The Faraday rotator 12a is a polarization plane rotating element which uses a YIG (Yttrium Iron Garnet) crystal for rotating the plane of polarization of light traveling within a magnetic field and which has a magneto-optical effect.

The YIG element is applied with a magnetic field H1 by means of electromagnets 12b-1 and 12b-2. The magnetic field H1 can be controlled by a current I which is the wavelength characteristic control signal CNT from the wavelength characteristic control signal generating means 16.

Accordingly, the amount of rotation of the polarization planes is controlled by changing the magnetic field H1 by means of the current I. The incidence angle of the polarized light may be varied by mechanically rotating the polarized light wavelength characteristic changing element 11, which is deposited on a glass substrate 13, in a direction d shown in FIG. 6, to thereby finely adjust the wavelength characteristic.

The ordinary and extraordinary rays (second polarized light), which have been flattened as they pass through the polarized light wavelength characteristic changing element 11, are subjected to inverse rotatory control by a Faraday rotator 17a, which corresponds to the polarization restoring means 17, in a direction such that the polarization planes which have been rotated by the pre-Faraday rotator 12a are returned to the original polarization plane.

This control can be accomplished by making the lengths of the Faraday rotators 12a and 17a equal to each other, positioning electromagnets 17b-1 and 17b-2 in the manner shown in FIG. 6, and setting the magnetism of the electromagnets such that the magnetic field is applied in an opposite direction (H2 in FIG. 6).

The extraordinary ray is thereafter rotated by a ½ wave plate 18b toward the ordinary ray, and is combined with the ordinary ray by a parallel rutile plate 18a corresponding to the polarized light synthesizing means 18.

The ordinary and extraordinary rays are coupled together by the parallel rutile plate 18a in such a manner that their relationship is reversed, in order to cancel out and thereby eliminate dispersion of the polarized light.

The polarized light is then emitted to an output fiber 1b through a collimating lens 4b. The output fiber 1b is securely affixed to a ferrule 2b. A lens holder 3b, to which the collimating lens 4b is fixed, is secured to the ferrule 2b by welding after the focal point is adjusted with respect to the output fiber 1b.

Figure 7:
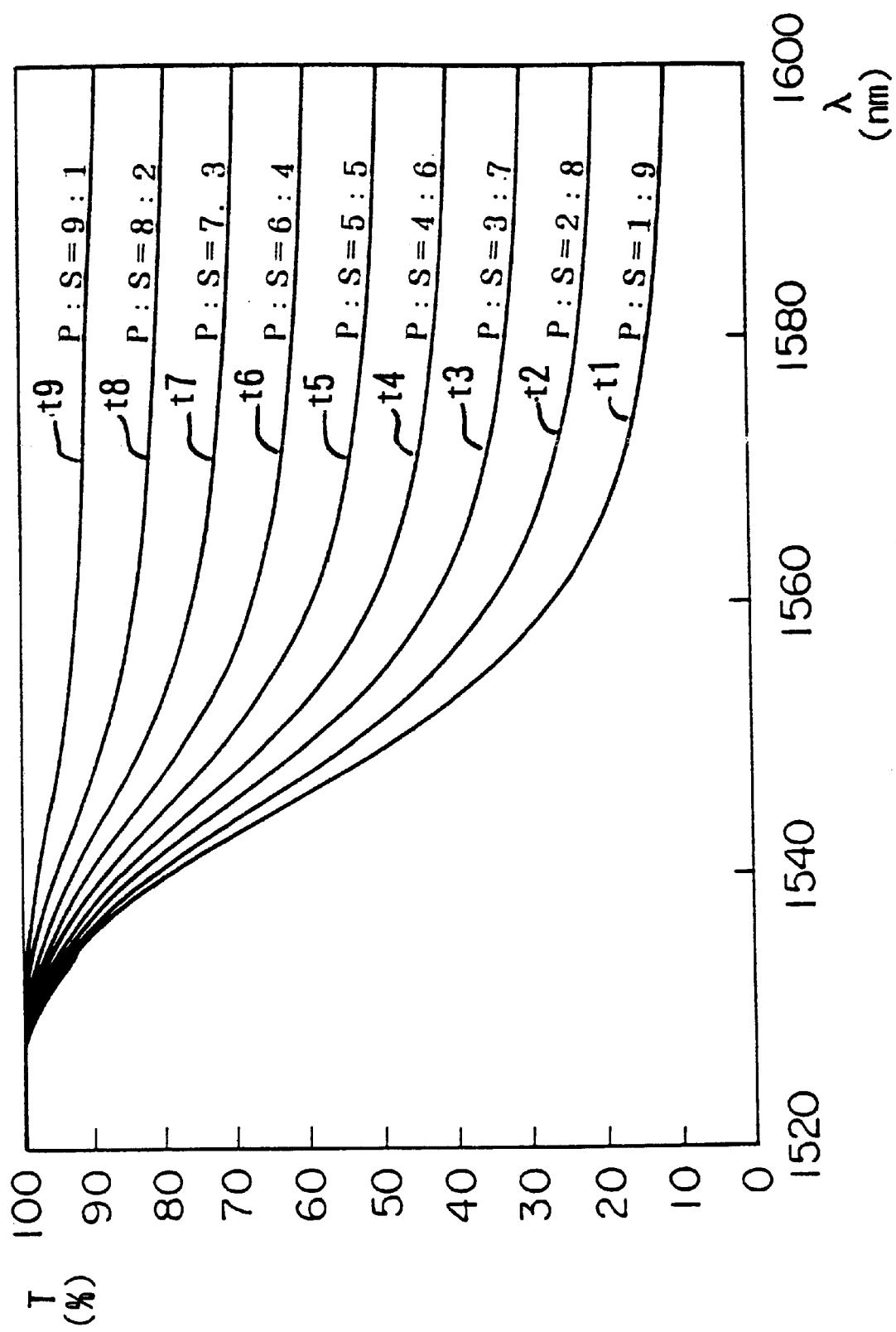
FIG. 7 is a graph showing wavelength characteristics of a polarized light wavelength characteristic changing element in the gain equalizer.

The wavelength characteristic and loss-wavelength characteristic of the polarized light wavelength characteristic changing element 11 will be now explained. FIG. 7 illustrates wavelength characteristics of the polarized light wavelength characteristic changing element 11 in the gain equalizer 10a, wherein the vertical and horizontal axes indicate transmittance T (%) and wavelength λ(nm), respectively.

As illustrated, the rate of change of transmittance with respect to wavelength is large in a wavelength region of 1540 nm to 1600 nm. Accordingly, the plane of polarization should desirably be rotated within this region.

In FIG. 7, a characteristic t1 has a ratio of P:S=1:9, a characteristic t2 has a ratio of P:S=2:8, and other characteristics have their respective ratios as shown in the figure.

Figure 8:
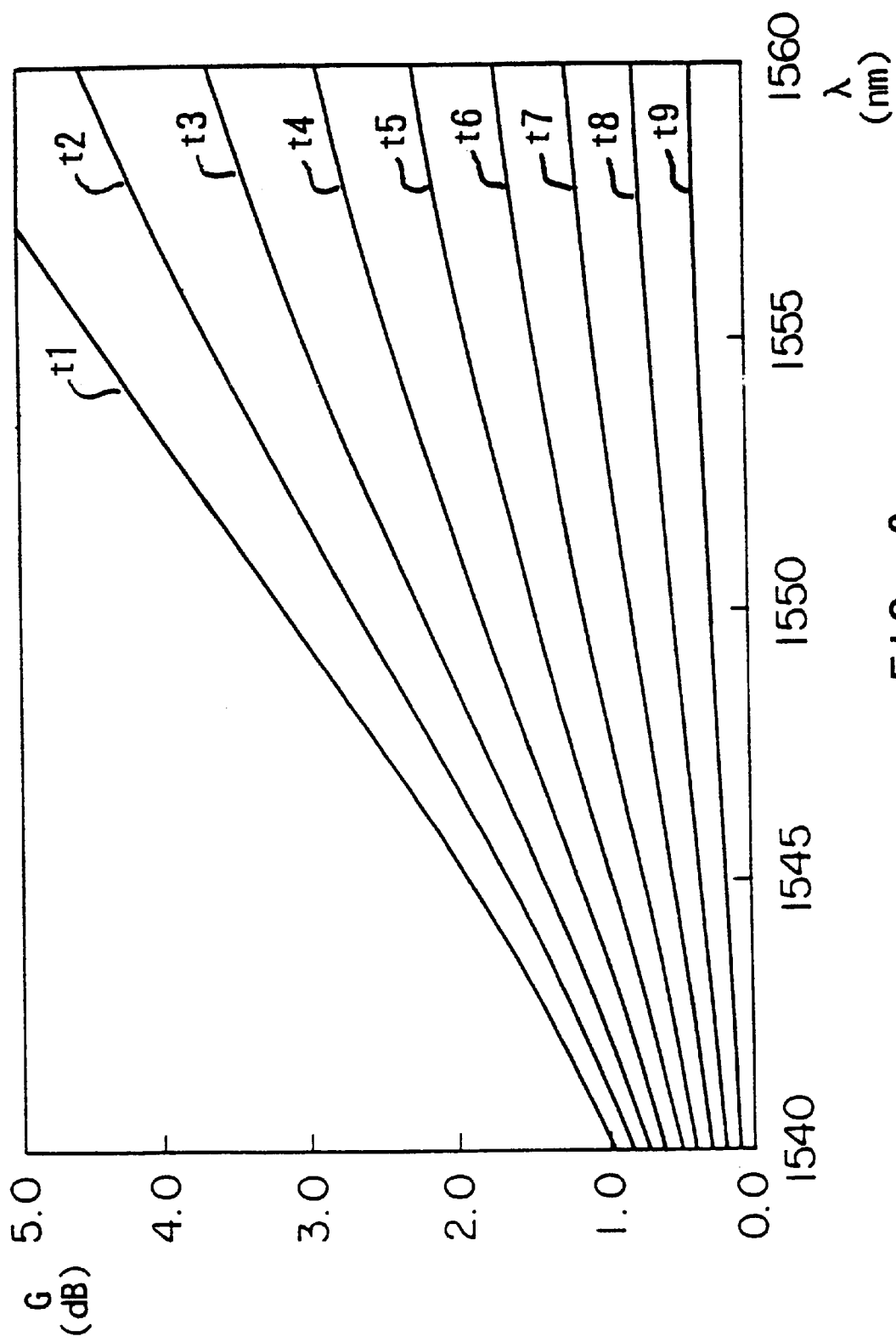
FIG. 8 is a graph showing loss-wavelength characteristics.

FIG. 8 illustrates loss-wavelength characteristics, wherein the vertical and horizontal axes indicate gain G (dB) and wavelength λ (nm), respectively. With respect to the characteristics t1 to t9 shown in FIG. 7, loss-wavelength characteristics as shown in FIG. 8 are obtained.

Although the aforementioned polarized light wavelength characteristic changing element 11 comprises a single element, a plurality of elements may be arranged for the respective separated rays of the polarized light.

Also, a plurality of polarized light wavelength characteristic changing elements having respective different wavelength characteristics may be arranged in multiple stages, and in this case, more complicated control can be performed on the wavelength characteristic.

Further, in the arrangement described above, the rays of light that have passed through the polarized light wavelength characteristic changing element 11 are synthesized and output, but reflected rays may alternatively be synthesized and output.

Figure 9:
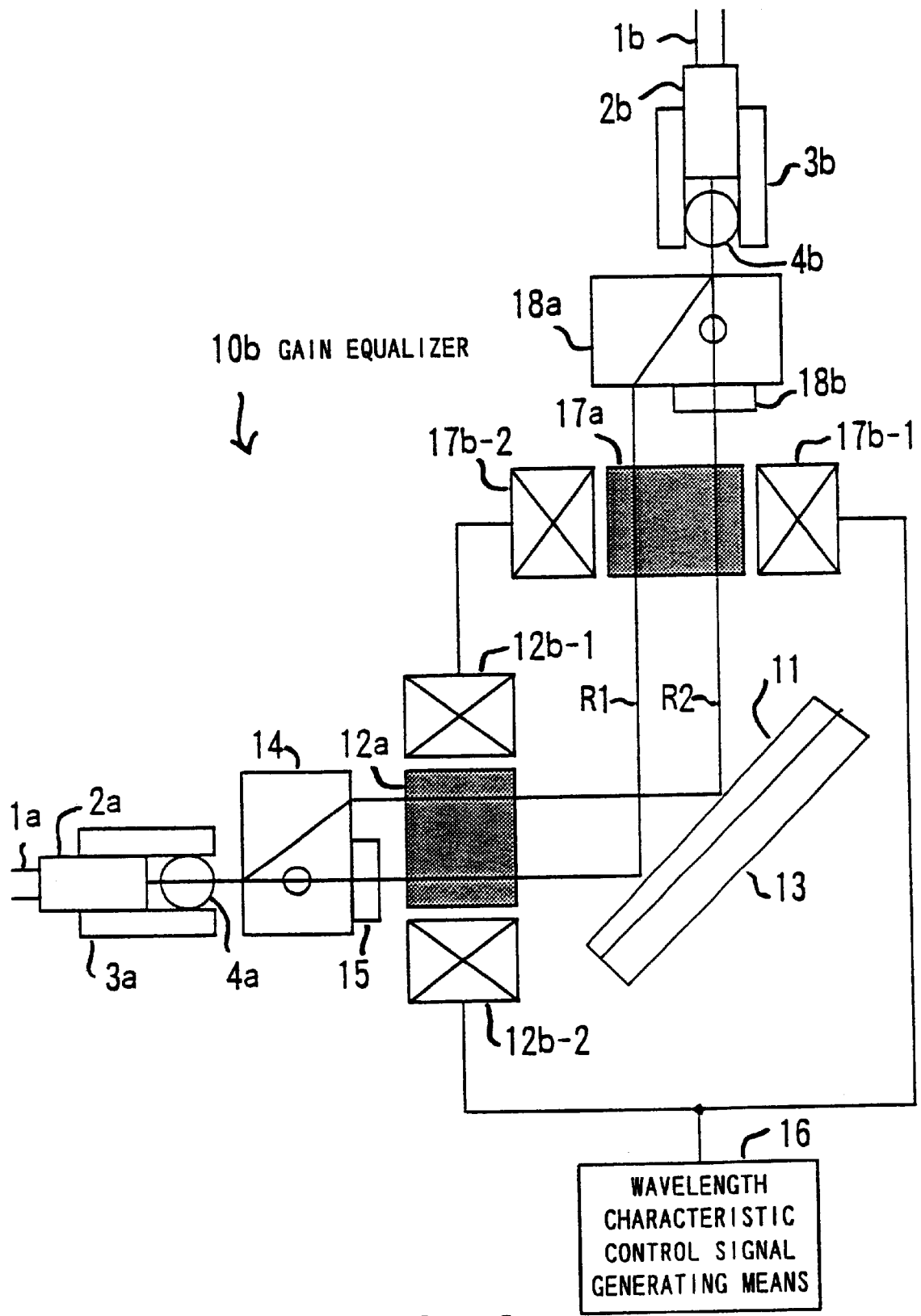
FIG. 9 is a diagram showing a gain equalizer which provides an output by synthesizing reflected light from the polarized light wavelength characteristic changing element.

FIG. 9 illustrates a gain equalizer which synthesizes reflected rays from the polarized light wavelength characteristic changing element 11 and outputs the synthesized light. As shown in FIG. 9, a gain equalizer 10b synthesizes reflected rays R1 and R2 from the polarized light wavelength characteristic changing element 11, which rays have been subjected to wavelength characteristic control, and outputs the synthesized light. The component parts and operation of the gain equalizer 10b are identical with those of the gain equalizer 10a, and therefore, description thereof is omitted.

Figure 10:
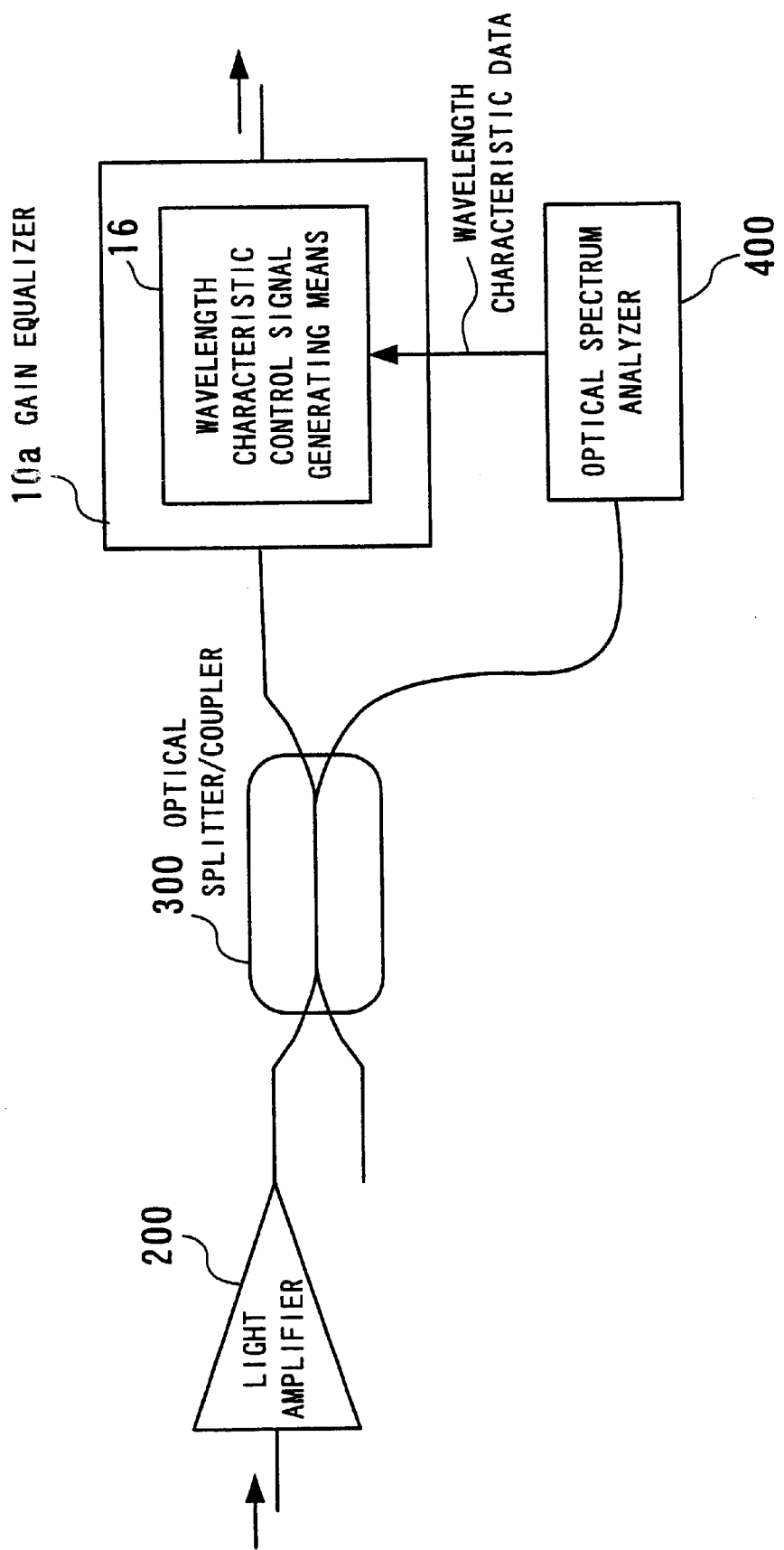
FIG. 10 is a diagram showing an example of system configuration employed in the case where applied magnetic fields are controlled.
Figure 11:
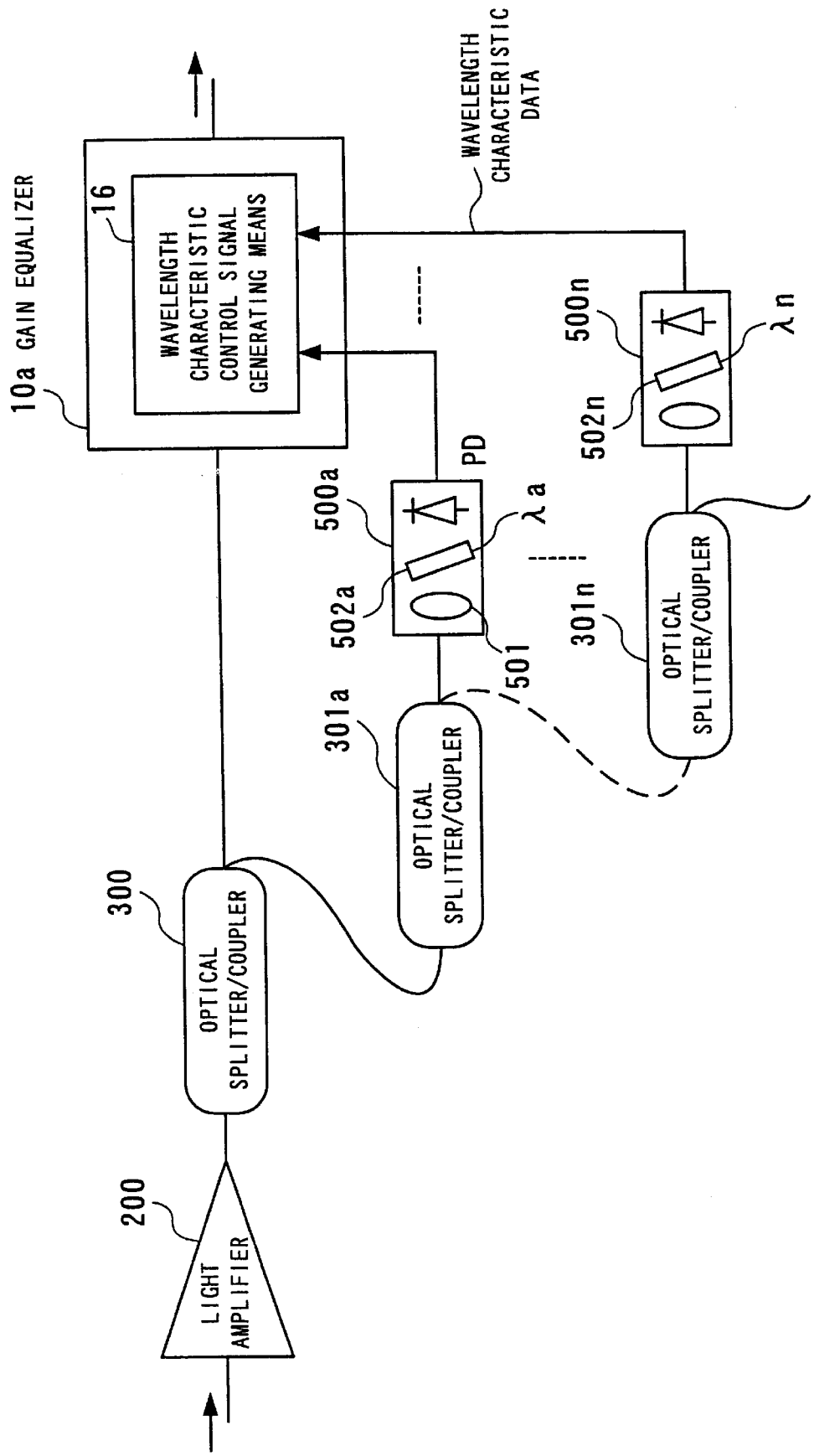
FIG. 11 is a diagram showing another example of system configuration employed in the case where the applied magnetic fields are controlled.

The following explains how the magnetic fields applied to the Faraday rotators 12a and 17a are controlled by means of the wavelength characteristic control signal generating means 16. FIGS. 10 and 11 show examples of system configuration for controlling the applied magnetic fields.

In FIG. 10, the output from a light amplifier 200 is split by an optical splitter/coupler 300, and one of the split rays of signal light is input to the gain equalizer 10a. The other split ray of signal light is input to an optical spectrum analyzer 400.

The optical spectrum analyzer 400, which comprises a diffraction grating, a photodiode or the like, measures the wavelength characteristic of the signal light and sends the result of measurement to the wavelength characteristic control signal generating means 16 inside the gain equalizer 10a as wavelength measurement data.

Based on the wavelength measurement data, the wavelength characteristic control signal generating means 16 determines the amount of the current I, which is the wavelength characteristic control signal CNT, and controls the applied magnetic fields.

In FIG. 11, after the output from the light amplifier 200 is split by the optical splitter/coupler 300, a split ray is further split by optical splitters/couplers 301a to 301n.

Split rays of the signal light split by the optical splitters/couplers 301a to 301n are converted by respective light/electricity converters 500a to 500n to electrical signals according to wavelengths.

The light/electricity converters 500a to 500n each comprise a lens 501, band-pass filters 502a to 502n, and a photodiode PD. The band-pass filters 502a to 502n perform filtering with respect to their respective set wavelengths λa to λn.

The filtered rays are then converted to electrical signals by the respective photodiodes PD according to wavelengths, and the outputs of the photodiodes are sent to the wavelength characteristic control signal generating means 16 as wavelength characteristic data.

Based on current difference values represented by the wavelength characteristic data, the wavelength characteristic control signal generating means 16 determines the amount of the current I, which is the wavelength characteristic control signal CNT, and controls the applied magnetic fields.

In the individual arrangements described above, the wavelength characteristic control signal generating means 16 is arranged inside the gain equalizer 10a, but may be provided externally as a driver for driving the gain equalizer 10a.

Figure 12:
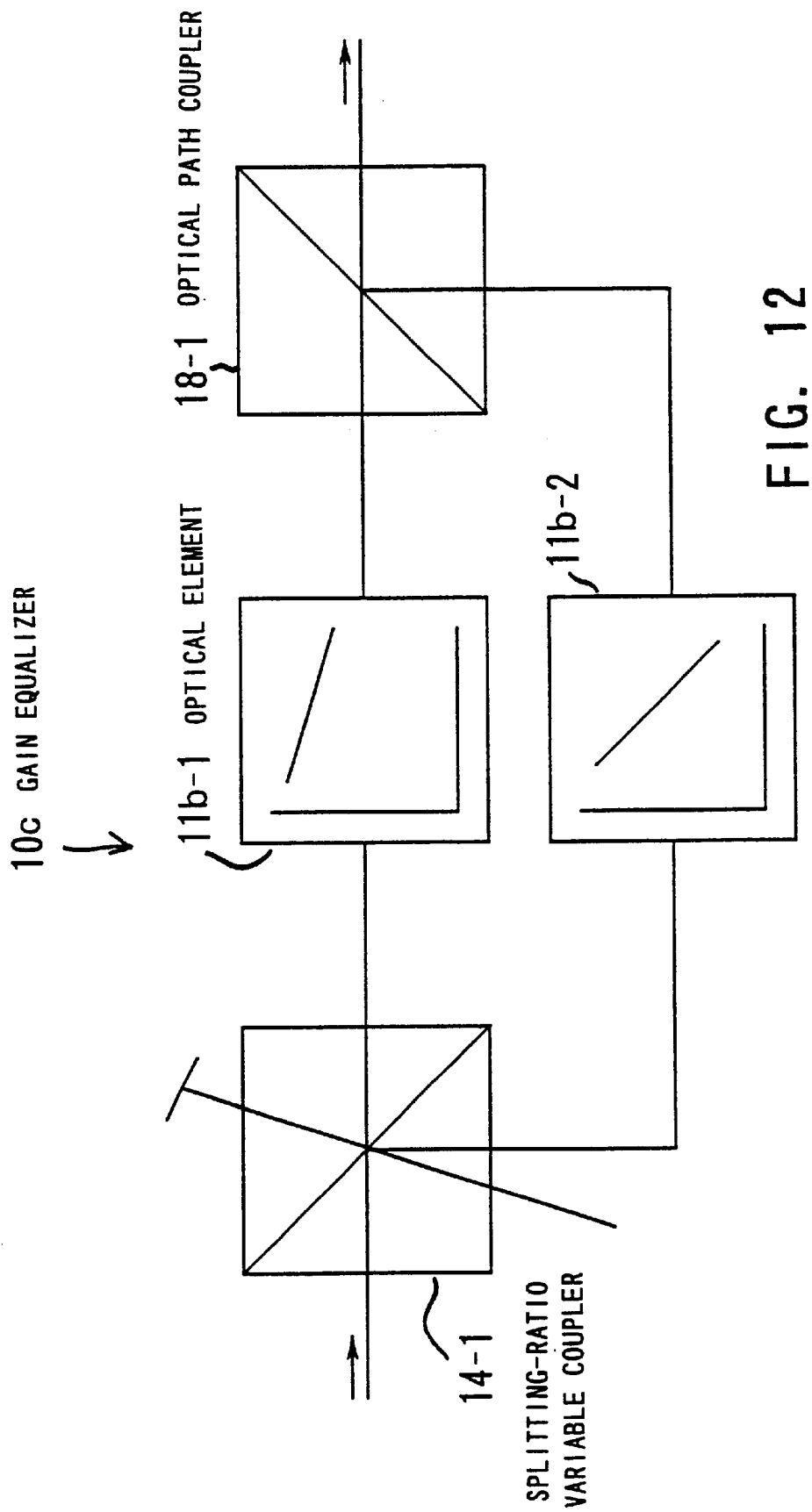
FIG. 12 is a diagram showing a gain equalizer constituted by a splitting-ratio variable coupler.

A gain equalizer constituted by a splitting-ratio variable coupler will be now described. FIG. 12 illustrates a gain equalizer comprising a splitting-ratio variable coupler.

A gain equalizer 10c uses a splitting-ratio variable coupler 14-1 in place of the polarized light separating means 14. The splitting-ratio variable coupler 14-1 determines the splitting ratio in accordance with a stress applied thereto and splits signal light in the splitting ratio thus determined.

Optical elements 11b-1 and 11b-2, each of which comprises a lens, a band-pass filter, etc., have respective different wavelength characteristics set therein and transmit therethrough respective split rays according to the set wavelength characteristics. An optical path coupler 18-1 couples the transmitted rays together and outputs the resultant light.

As described above, the gain equalizer according to the present invention performs rotatory control on the plane of polarization of light incident on the polarized light wavelength characteristic changing element 11 so that the gain-wavelength characteristic may be flattened by means of a loss-wavelength characteristic reverse to the gain-wavelength characteristic.

Thus, even multi-wavelength signal light whose gain difference between wavelengths varies depending on the operating conditions of an EDF in a light amplifier can be given a loss-wavelength characteristic corresponding to such variation by the gain equalizer, whereby signal light having no gain difference between wavelengths can be sent to a transmission path.

Figure 13:
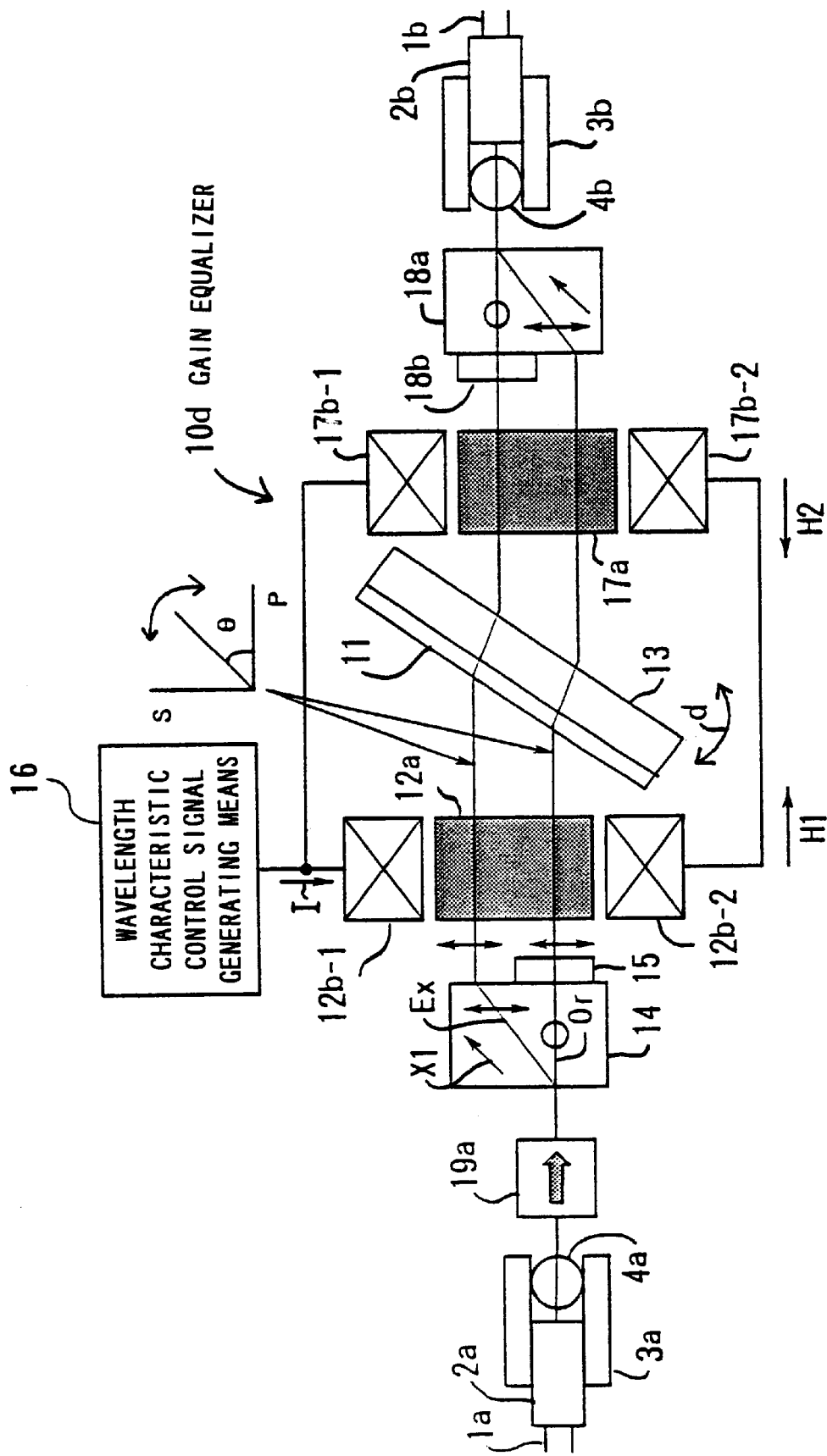
FIG. 13 is a diagram showing a gain equalizer in which an isolator is inserted.

A gain equalizer having an isolator inserted therein will be now described. FIG. 13 illustrates a gain equalizer in which an isolator is inserted.

A gain equalizer 10d has a polarization-independent isolator arranged in a space beam between the input fiber lens and the polarized light separating means 14 or between the input and output fiber lenses.

In FIG. 13, for example, an isolator 19a is arranged between the collimating lens 4a, which is the input fiber lens, and the parallel rutile plate 14 corresponding to the polarized light separating means 14.

By inserting the isolator 19a in this manner, it is possible to provide antireflection coating against unnecessary reflected waves generated at the portion where the optical fiber is coupled or at the connecting portion between the optical fiber and the optical component.

Figure 14:
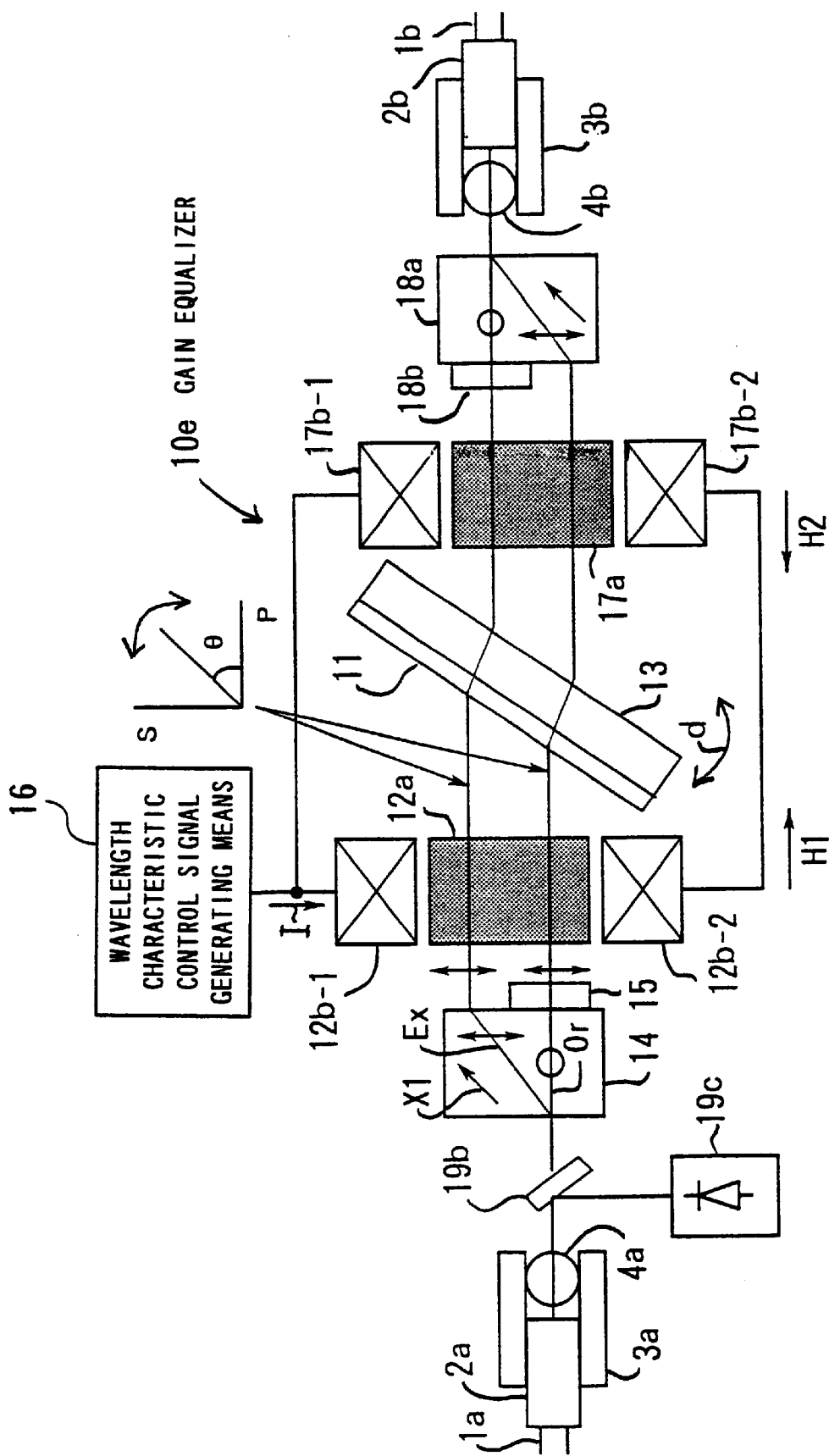
FIG. 14 is a diagram showing a gain equalizer in which optical splitting means is inserted.

A gain equalizer having optical splitting means inserted therein will be now described. FIG. 14 illustrates a gain equalizer in which optical splitting means is inserted.

In a gain equalizer 10d, optical splitting means for splitting light is arranged in the space beam between the input fiber lens and the polarized light separating means 14 or between the input and output fiber lenses.

In FIG. 14, for example, the optical splitting means corresponds to a coupler film 19b arranged between the collimating lens 4a, which is the input fiber lens, and the parallel rutile plate 14 corresponding to the polarized light separating means 14.

A photodiode 19c is connected to the coupler film 19b and converts a split ray of light to an electrical signal.

By inserting the coupler film 19b in this manner, it is possible to split light from within the gain equalizer.

Figure 15:
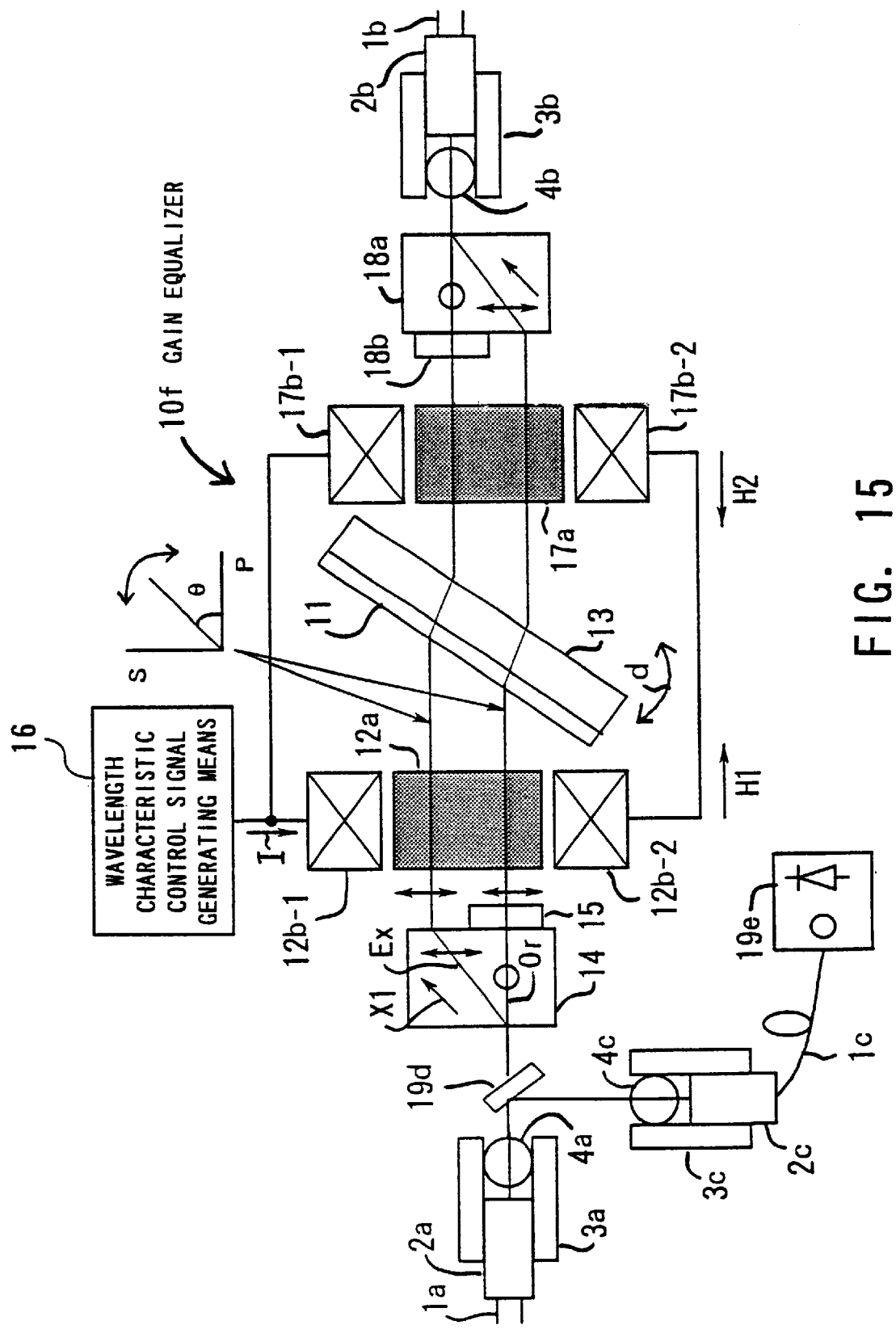
FIG. 15 is a diagram showing a gain equalizer in which wavelength multiplexing means is inserted.

A gain equalizer having wavelength multiplexing means inserted therein will be now described. FIG. 15 illustrates a gain equalizer in which wavelength multiplexing means is inserted.

In a gain equalizer 10f, wavelength multiplexing means for multiplexing wavelengths is arranged in the space beam between the input fiber lens and the polarized light separating means 14 or between the input and output fiber lenses.

In FIG. 15, for example, the wavelength multiplexing means corresponds to a WDM film 19d arranged between the collimating lens 4a, which is the input fiber lens, and the parallel rutile plate 14 corresponding to the polarized light separating means 14.

The WDM film 19d multiplexes the wavelength of an optical signal from the optical fiber 1a with that of an optical signal input thereto from a pumped laser 19e (arranged outside of the gain equalizer 10f) via an optical fiber 1c.

The optical fiber 1c is securely affixed to a ferrule 2c, and a lens holder 3c, to which a collimating lens 4c is fixed, is secured to the ferrule 2c by welding after the focal point is adjusted with respect to the input fiber 1c.

Thus, by inserting the WDM film 19d, it is possible to multiplex wavelengths within the gain equalizer.

Figure 16:
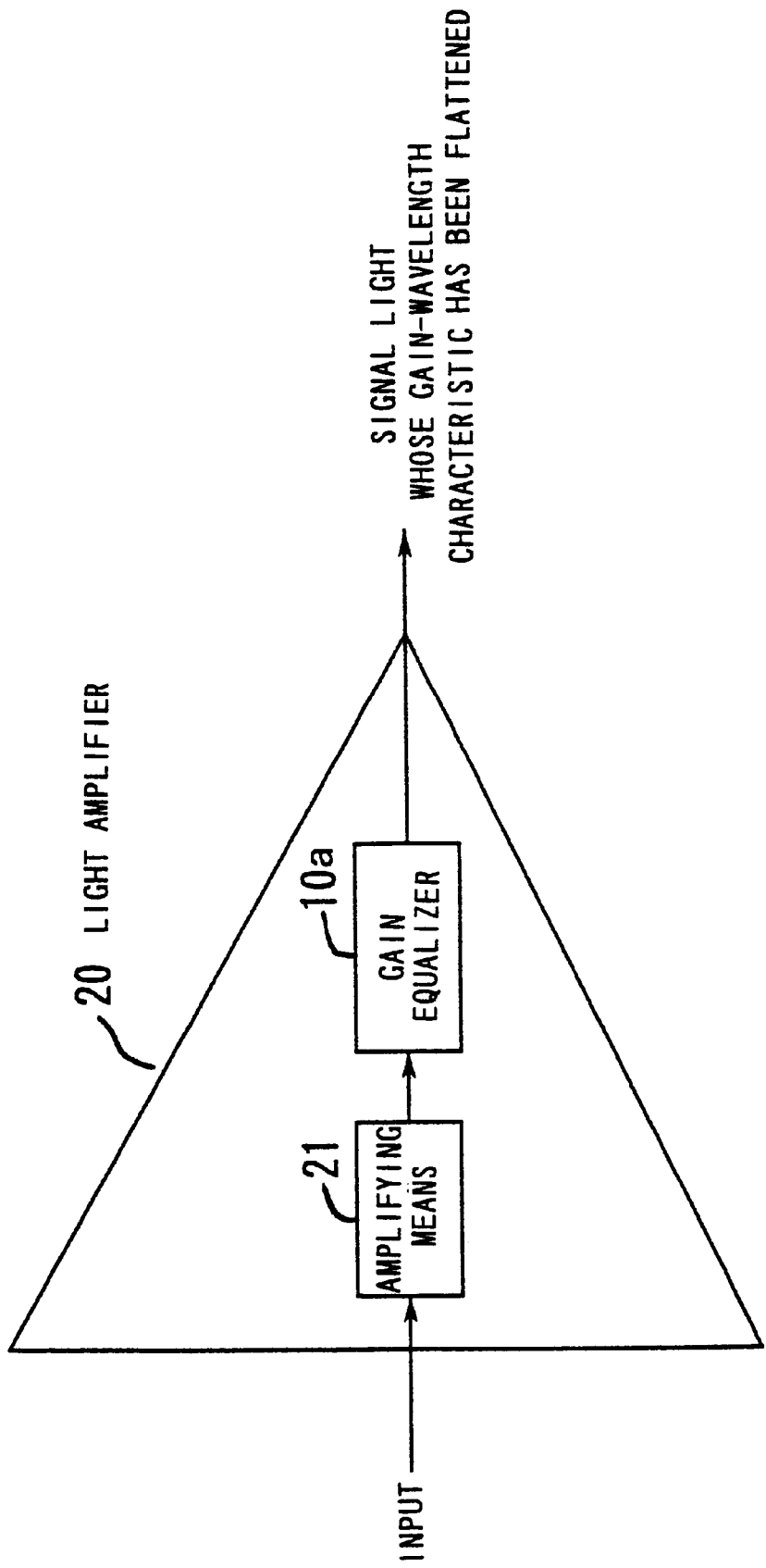
FIG. 16 is a diagram illustrating the principles of a light amplifier according to the present invention.
Figure 17:
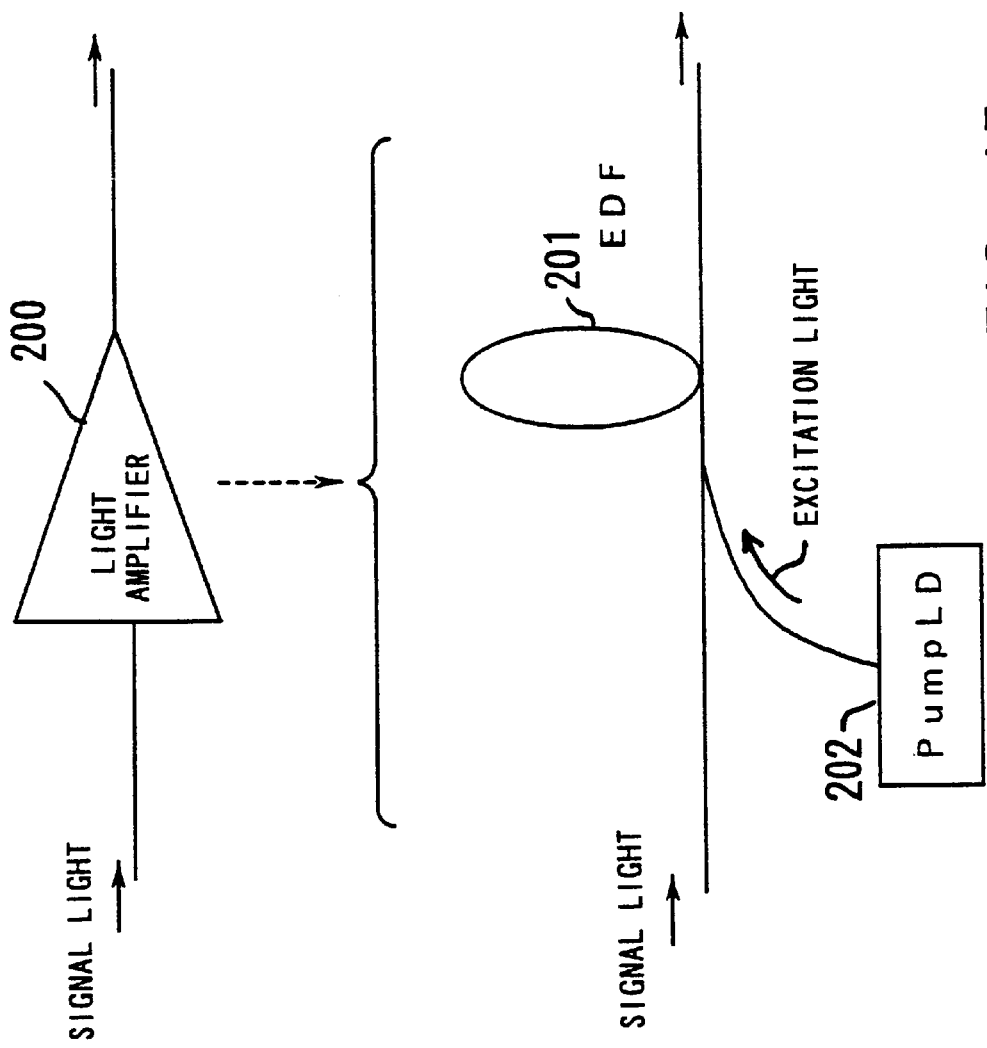
FIG. 17 is a diagram schematically showing the arrangement of a conventional light amplifier.
Figure 18A:
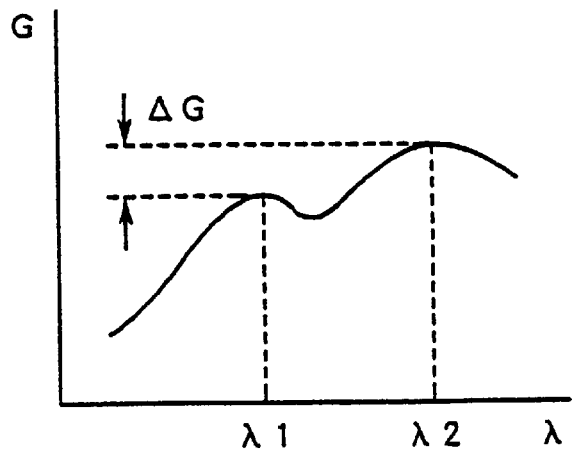
FIG. 18(A) is a graph showing a cumulative gain-wavelength characteristic of a plurality of light amplifiers.
Figure 18B:
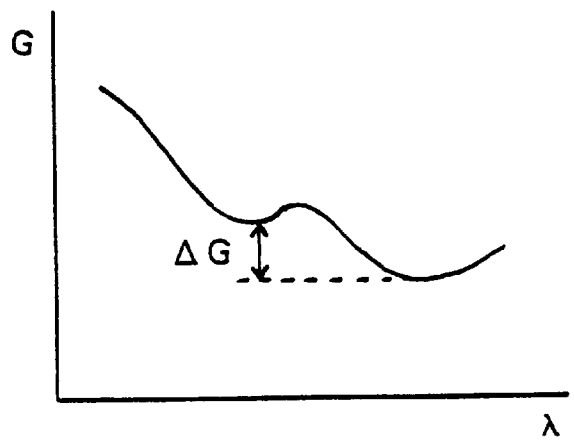
FIG. 18(B) is a graph showing a loss-wavelength characteristic of a gain equalizer.
Figure 18C:
FIG. 18(C) is a graph showing a flattened gain wavelength characteristic.

A light amplifier according to the present invention, which incorporates the gain equalizer 10a therein, will be now described. FIG. 16 illustrates the principles of a light amplifier according to the present invention. A light amplifier 20 amplifies signal light and actively equalizes the gain-wavelength characteristic.

Amplifying means 21 amplifies input signal light. The gain equalizer 10a controls the gain-wavelength characteristic of the signal light which characteristic has varied as a result of amplification.

As described above, the light amplifier 20 according to the present invention performs rotatory control on amplified signal light by rotating the plane of polarization of the signal light incident on the polarized light wavelength characteristic changing element so that the gain-wavelength characteristic may be flattened by means of a loss-wavelength characteristic reverse to the gain-wavelength characteristic.

Thus, in a WDM optical transmission system for transmitting/relaying signal light by means of the light amplifier 20 having a gain equalizer built therein, the transmission band is ensured against external factors such as loss fluctuation of the transmission path and the transmission quality can be maintained with reliability.

Since the light amplifier 20 of uniform specification that does not require individual adjustment/setting can be used, flattening of the gain-wavelength characteristic can be optimized with ease and the cost of the light amplifier 20 can be reduced.

As described above, the wavelength characteristic control device according to the present invention has a construction such that the plane of polarization of light incident on the polarized light wavelength characteristic changing element is subjected to rotatory control to change the ratio of the P-polarized ray to the S-polarized ray, thereby variably controlling the wavelength characteristic. Consequently, even if there occurs a change in external factors such as environmental temperature, the wavelength characteristic can be variably controlled in a satisfactory manner.

The gain equalizer according to the present invention has a construction such that the plane of polarization of light incident on the polarized light wavelength characteristic changing element is subjected to rotatory control to thereby flatten the gain-wavelength characteristic by means of a loss-wavelength characteristic reverse to the gain-wavelength characteristic. Thus, even when the gain-wavelength characteristic of signal light amplified by a light amplifier varies, it can be actively equalized and flattened, making it possible to improve the transmission quality.

The light amplifier according to the present invention has a construction such that amplified signal light is subjected to rotatory control by rotating the plane of polarization of the light incident on the polarized light wavelength characteristic changing element, to thereby flatten the gain-wavelength characteristic by means of a loss-wavelength characteristic reverse to the gain-wavelength characteristic. Thus, even when the gain-wavelength characteristic of amplified signal light varies, it can be actively equalized and flattened, making it possible to improve the transmission quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A gain equalizer for actively equalizing a gain-wavelength characteristic, comprising:

polarized light separating means for separating polarized signal light into a plurality of separated polarized rays;

polarization plane coincidence control means for making planes of polarization of the plurality of separated polarized rays coincident with each other, to thereby generate first polarized light;

polarization variable control means for subjecting the plane of polarization of the first polarized light to rotatory control to change a ratio of a P-polarized ray to an S-polarized ray, to thereby generate polarization plane rotated light;

a polarized light wavelength characteristic changing element passing the polarization plane rotated light, to thereby generate second polarized light having a wavelength characteristic corresponding to the changed ratio;

polarization restoring means for subjecting the plane of polarization of the second polarized light to inverse rotatory control reverse to the rotatory control performed by said polarization variable control means on the plane of polarization of the first polarized light, to restore a polarized state identical with that of the first polarized light and thereby generate third polarized light; and polarized light synthesizing means for synthesizing the third polarized light.

2. The gain equalizer according to claim 1, wherein said polarized light separating means separates the polarized signal light in which wavelengths are multiplexed.

3. The gain equalizer according to claim 1, wherein said polarized light separating means comprises one of a birefringent crystal and a dielectric multilayer film.

4. The gain equalizer according to claim 1, wherein said polarization plane coincidence control means rotates the plane of polarization of one separated polarized ray by 90 degrees to thereby make the planes of polarization coincident with each other.

5. The gain equalizer according to claim 1, wherein said polarized light synthesizing means rotates the plane of polarization of one polarized ray by 90 degrees and then synthesizes the polarized light.

6. The gain equalizer according to claim 1, wherein said polarized light synthesizing means comprises one of a birefringent crystal and a dielectric multilayer film.

7. The gain equalizer according to claim 1, wherein said polarized light wavelength characteristic changing element is capable of changing an angle of incidence of the polarized light.

8. The gain equalizer according to claim 1, wherein said polarized light wavelength characteristic changing element comprises a plurality of elements arranged for said plurality of separated polarized rays, respectively.

9. The gain equalizer according to claim 1, wherein said polarized light wavelength characteristic changing element comprises a plurality of elements having respective different wavelength characteristics and arranged in multiple stages.

10. The gain equalizer according to claim 1, wherein said polarized light wavelength characteristic changing element generates, as the second polarized light, reflected light reflected thereby.

11. The gain equalizer according to claim 1, wherein said polarization variable control means comprises a Faraday rotator.

12. The gain equalizer according to claim 1, wherein said polarization variable control means performs the rotatory control on the plane of polarization by changing a magnetic field applied to the Faraday rotator.

13. The gain equalizer according to claim 12, further comprising wavelength characteristic control signal generating means for sending out a wavelength characteristic control signal, which is an electrical signal for controlling the applied magnetic field, to control the wavelength characteristic.

14. The gain equalizer according to claim 13, wherein said wavelength characteristic control signal generating means generates the wavelength characteristic control signal in accordance with wavelength characteristic data which is a result of measurement by a light measuring device to which the signal light is input.

15. The gain equalizer according to claim 13, wherein said wavelength characteristic control signal generating means generates the wavelength characteristic control signal in accordance with wavelength characteristic data which is a result of measurement by a light/electricity converter which converts the signal light to electrical signals according to wavelengths.

16. The gain equalizer according to claim 1, wherein said polarized light separating means comprises an optical splitter/coupler having a splitting ratio which is variable and yet independent of the polarized light.

17. The gain equalizer according to claim 16, wherein said polarized light wavelength characteristic changing element comprises optical elements having different wavelength characteristics and transmitting therethrough split light rays, respectively.

18. The gain equalizer according to claim 1, wherein a polarization-independent isolator is arranged in a space beam between an input fiber lens and said polarized light separating means or between the input fiber lens and an output fiber lens.

19. The gain equalizer according to claim 1, wherein optical splitting means for splitting light is arranged in a space beam between an input fiber lens and said polarized light separating means or between the input fiber lens and an output fiber lens.

20. The gain equalizer according to claim 1, wherein wavelength multiplexing means for multiplexing wavelengths is arranged in a space beam between an input fiber lens and said polarized light separating means or between the input fiber lens and an output fiber lens.

21. A light amplifier for amplifying signal light and actively equalizing a gain-wavelength characteristic, comprising:
   amplifying means for amplifying the signal light;
   polarized light separating means for separating the amplified signal light into a plurality of separated polarized rays;
   polarization plane coincidence control means for making planes of polarization of the plurality of separated polarized rays coincident with each other, to thereby generate first polarized light;
   polarization variable control means for subjecting the plane of polarization of the first polarized light to rotatory control to change a ratio of a P-polarized ray to an S-polarized ray, to thereby generate polarization plane rotated light;
   a polarized light wavelength characteristic changing element passing the polarization plane rotated light, to thereby generate second polarized light having a wavelength characteristic corresponding to the changed ratio;
   polarization restoring means for subjecting the plane of polarization of the second polarized light to inverse rotatory control reverse to the rotatory control performed by said polarization variable control means on the plane of polarization of the first polarized light, to restore a polarized state identical with that of the first polarized light and thereby generate the third polarized light; and
   polarized light synthesizing means for synthesizing the third polarized light.

22. A gain equalizer comprising:
   a first birefringent device changing a light into a plane of polarized light;
   a first polarization rotator variably rotating the plane of polarized light;
   an optical filter filtering the rotated plane of polarized light;
   a second polarization rotator variable rotating the filtered, rotated plane of polarized light; and
   A second polarization device receiving the rotated, filtered, rotated plane of polarized light, gain equalizer thereby equalizing a gain-wavelength characteristic of the light.

23. A gain equalizer comprising:
   a first birefringent device changing a light into a plane of polarized light;
   a first polarization rotator variably rotating the plane of polarized light;
   an optical filter filtering the rotated plane of polarized light;
   a second polarization rotator variable rotating the filtered, rotated plane of polarized light; and
   a second birefringent device receiving the rotated, filtered, rotated plane of polarized light, then gain equalizer thereby equalizing a gain-wavelength characteristic of the light.

24. A gain equalizer for actively equalizing a gain-wavelength characteristic, comprising:
   a polarized light separator separating polarized signal light into a plurality of separated polarized rays;
   a polarization plane coincidence controller making planes of polarization of the plurality of separated polarized rays coincident with each other, to thereby generate first polarized light;
   a polarization variable controller subjecting the plane of polarization of the first polarized light to rotatory control to change a ratio of a P-polarized ray to an S-polarized ray, to thereby generate polarization plane rotated light;
   a polarized light wavelength characteristic changing element passing the polarization plane rotated light to thereby generate second polarized light having a wavelength characteristic corresponding to the changed ratio;

a polarization restorer subjecting the plane of polarization of the second polarized light to inverse rotatory control reverse to the rotatory control performed by said polarization variable controller on the plane of polarization of the first polarized light, to restore a polarized state identical with that of the first polarized light and thereby generate third polarized light; and a polarized light synthesizer synthesizing the third polarized light.

25. The gain equalizer according to claim 24, wherein said polarized light separator separates the polarized signal light in which wavelengths are multiplexed.

26. The gain equalizer according to claim 24, wherein said polarized light separator comprises one of a birefringent crystal and a dielectric multilayer film.

27. The gain equalizer according to calm 24, wherein said polarization plane coincidence controller rotates the plane of polarization of one separated polarized ray by 90 degrees to thereby make the planes of polarization coincident with each other.

28. The gain equalizer according to claim 24, wherein said polarized light synthesizer rotates the plane of polarization of one polarized ray by 90 degrees and then synthesizes the polarized light.

29. The gain equalizer according to claim 24, wherein said polarized light synthesizer comprises one of a birefringent crystal and a dielectric multilayer film.

30. The gain equalizer according to claim 24, wherein said polarized light wavelength characteristic changing element is capable of changing an angle of incidence of the polarized light.

31. The gain equalizer according claim 24, wherein said polarized light wavelength characteristic changing element comprises a plurality of elements arranged for said plurality of separated polarized rays, respectively.

32. The gain equalizer according to claim 24, wherein said polarized light wavelength characteristic changing element comprises a plurality of elements having respective different wavelength characteristics and arranged in multiple stages.

33. The gain equalizer according to claim 24, wherein said polarized light wavelength characteristic changing element generates, as the second polarized light, reflected light reflected thereby.

34. The gain equalizer according to claim 24, wherein said polarization variable controller comprises a Faraday rotator.

35. The gain equalizer according to claim 24, wherein said polarization variable controller performs the rotatory control on the plane of polarization by changing a magnetic field applied to the Faraday rotator.

36. The gain equalizer according to claim 35, further comprising a wavelength characteristic control signal generator sending out a wavelength characteristic control signal, which is an electrical signal for controlling the applied magnetic field, to control the wavelength characteristic.

37. The gain equalizer according to claim 36, wherein said wavelength characteristic control signal generator generates the wavelength characteristic control signal in accordance with wavelength characteristic data which is a result of measurement by a light measuring device to which the signal light is input.

38. The gain equalizer according to claim 36, wherein said wavelength characteristic control signal generator generates the wavelength characteristic control signal in accordance with wavelength characteristic data which is a result of measurement by a light/electricity converter which converts the signal light to electrical signals according to wavelengths.

39. The gain equalizer according to claim 24, said polarized light separator comprises an optical splitter/coupler having a splitting ratio which is variable and yet independent of the polarized light.

40. The gain equalizer according to claim 39, wherein said polarized light wavelength characteristic changing element comprises optical elements having different wavelength characteristics and transmitting therethrough split light rays, respectively.

41. The gain equalizer according to claim 24, wherein a polarization-indpendent isolator is arranged in a space beam between an input fiber lens and said polarized light separator or between the input fiber lens and an output fiber lens.

42. The gain equalizer according to claim 24, wherein optical splitter splitting light is arranged in a space beam between an input fiber lens and said polarized light separator or between the input fiber lens and an output fiber lens.

43. The gain equalizer according to claim 24, wherein a wavelength multiplexer multiplexing wavelengths is arranged in a space beam between an input fiber lens and said polarized light separator or between the input fiber lens and an output fiber lens.

44. A light amplifier for amplifying signal light and actively equalizing a gain-wavelength characteristic, comprising:

an amplifier amplifying the signal light;

a polarized light separator separating the amplified signal light into a plurality of separated polarized rays;

a polarization plane coincidence controller making planes of polarization of the plurality of separated polarized rays coincident with each other, to thereby generate first polarized light;

a polarization variable controller subjecting the plane of polarization of the first polarized light to rotatory control to change a ratio of a P-polarized ray to an S-polarized ray, to thereby generate polarization plane rotated light;

a polarized light wavelength characteristic changing element passing the polarization plane rotated light, to thereby generate second polarized light having a wavelength characteristic corresponding to the changed ratio;

a polarization restorer subjecting the plane of polarization of the second polarized light to inverse rotatory control reverse to the rotatory control performed by said polarization variable controller on the plane of polarization of the first polarized light, to restore a polarized state identical with that of the first polarized light and thereby generate the third polarized light; and a polarized light synthesizer synthesizing the third polarized light.

45. An apparatus comprising:

a gain equalizer comprising:

a polarized light separator separating polarized signal light into a plurality of separated polarized rays, a polarization plane coincidence controller making planes of polarization of the plurality of separated polarized rays coincident with each other, to thereby generate first polarized light, a polarization variable controller subjecting the plane of polarization of the first polarized light to rotatory control to change a ratio of a P-polarized ray to an S-polarized ray, to thereby generate polarization plane rotated light, a polarized light wavelength characteristic changing element passing the polarization plane rotated light to thereby generate second polarized light having a wavelength characteristic corresponding to the changed ratio, a polarization restorer subjecting the plane of polarization of the second polarized light to inverse rotatory control reverse to the rotatory control performed by said polarization variable controller on the plane of polarization of the first polarized light, to restore a polarized state identical with that of the first polarized light and thereby generate third polarized light, and a polarized light synthesizer synthesizing the third polarized light, to thereby actively equalize a gain-wavelength characteristic of the polarized signal light.

46. An apparatus comprising:

a gain equalizer comprising:

means for separating polarized signal light into a plurality of separated polarized rays, means for making planes of polarization of the plurality of separated polarized rays coincident with each other, to thereby generate first polarized light, means for subjecting the plane of polarization of the first polarized light to rotatory control to change a ratio of a P-polarized ray to an S-polarized ray, to thereby generate polarization plane rotated light, means for passing the polarization plane rotated light to thereby generate second polarized light having a wavelength characteristic corresponding to the changed ratio, means for subjecting the plane of polarization of the second polarized light to inverse rotatory control reverse to the rotatory control performed by said means for subjecting on the plane of polarization of the first polarized light, to restore a polarized state identical with that of the first polarized light and thereby generate third polarized light, and means for synthesizing the third polarized light, to thereby actively equalize a gain-wavelength characteristic of the polarized signal light.

47. A gain equalizer comprising:

a first polarization device changing a light into a plane of polarized light;

a first polarization rotator variably rotating the plane of polarized light;

an optical filter filtering the rotated plane of polarized light;

a second polarization rotator variable rotating the filtered, rotated plane of polarized light; and a second polarization device receiving the rotated, filtered, rotated plane of polarized light, the gain equalizer thereby equalizing a gain-wavelength characteristic of the light.

48. A gain equalizer comprising:

a first birefringent device changing a light into a plane of polarized light;

a first polarization rotator variably rotating the plane of polarized light;

an optical filter filtering the rotated plane of polarized light;

a second polarization rotator variable rotating the filtered, rotated plane of polarized light; and a second birefringent device receiving the rotated, filtered, rotated plane of polarized light, the gain equalizer thereby equalizing a gain-wavelength characteristic of the light.

49. A gain equalizer comprising:

means for changing a light into a plane of polarized light;

means for variably rotating the plane of polarized light;

means for filtering the rotated plane of polarized light;

means for variable rotating the filtered, rotated plane of polarized light, and means for passing the rotated, filtered, rotated plane of polarized light, the gain equalizer thereby equalizing a gain-wavelength characteristic of the light.

50. A method comprising:

changing a light into a plane of polarized light;

variably rotating the plane of polarized light;

means for filtering the rotated plane of polarized light;

variable rotating the filtered, rotated plane of polarized light; and passing the rotated, filtered, rotated plane of polarized light, the method thereby equalizing a gain-wavelength characteristic of the light.

* * * * *